(12) United States Patent
Wiley et al.

(10) Patent No.: US 9,369,237 B2
(45) Date of Patent: Jun. 14, 2016

(54) RUN-LENGTH DETECTION AND CORRECTION

(71) Applicant: QUALCOMM Incorporated, San Diego, CA (US)

(72) Inventors: George Alan Wiley, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/453,287

(22) Filed: Aug. 6, 2014

(65) Prior Publication Data

US 2015/0043358 A1 Feb. 12, 2015

Related U.S. Application Data

(60) Provisional application No. 61/863,686, filed on Aug. 8, 2013, provisional application No. 61/943,959, filed on Feb. 24, 2014.

(51) Int. Cl.
*H04L 1/00* (2006.01)
*H04L 12/26* (2006.01)
*H04L 25/02* (2006.01)
*H04L 25/14* (2006.01)
*H04L 25/49* (2006.01)

(52) U.S. Cl.
CPC ............ *H04L 1/0056* (2013.01); *H04L 1/0014* (2013.01); *H04L 25/0272* (2013.01); *H04L 25/14* (2013.01); *H04L 25/49* (2013.01); *H04L 43/0811* (2013.01)

(58) Field of Classification Search
None
See application file for complete search history.

(56) References Cited

U.S. PATENT DOCUMENTS

| 5,517,533 A | 5/1996 | Szmauz et al. | |
|---|---|---|---|
| 6,147,963 A * | 11/2000 | Walker | H03M 5/16 370/200 |
| 2008/0212709 A1* | 9/2008 | Wiley | H04L 5/20 375/286 |

FOREIGN PATENT DOCUMENTS

| EP | 0414368 A2 | 2/1991 |
|---|---|---|
| GB | 2357408 A | 6/2001 |

OTHER PUBLICATIONS

International Search Report and Written Opinion—PCT/US2014/050118—ISA/EPO—Nov. 10, 2014.

* cited by examiner

*Primary Examiner* — Charles C Jiang
*Assistant Examiner* — George Atkins, Jr.
(74) *Attorney, Agent, or Firm* — Loza & Loza, LLP

(57) ABSTRACT

System, methods and apparatus are described that facilitate transmission of data, particularly between two devices within electronic equipment. The apparatus may determine whether a run-length violation will occur or is likely to occur if a first sequence of symbols provided by a mapper of an M-Wire N-Phase encoder is transmitted on a plurality of wires. A second sequence of symbols may be substituted for the first sequence of symbols. The second sequence of symbols may comprise a surplus sequence of symbols that is not used for mapping data in the mapper.

30 Claims, 21 Drawing Sheets

| Row # | 7 Symbols From Tx Mapper | | | | | | | Priority | Replaced Symbols to the Encoder | | | | | | |
|---|---|---|---|---|---|---|---|---|---|---|---|---|---|---|---|
| | s0 | s1 | s2 | s3 | s4 | s5 | s6 | | s0' | s1' | s2' | s3' | s4' | s5' | s6' |
| 1 | s0 | 1 | 3 | 1 | 3 | 1 | s6 | 1 | s0 | s6 | 0 | 4 | 4 | 3 | 4 |
| 2 | s0 | 3 | 1 | 3 | 1 | 3 | s6 | 1 | s0 | s6 | 1 | 4 | 4 | 3 | 4 |
| 3 | 1 | 3 | 1 | 3 | 1 | 3 | 1 | 2 | s3 | 0 | 2 | 4 | 4 | 3 | 4 |
| 4 | 1 | 3 | 1 | s3 | 3 | 1 | 3 | 2 | s3 | 1 | 2 | 4 | 4 | 3 | 4 |
| 5 | 3 | 1 | 3 | s3 | 1 | 3 | 1 | 2 | s3 | 2 | 2 | 4 | 4 | 3 | 4 |
| 6 | 3 | 1 | 3 | s3 | 3 | 1 | 3 | 2 | s3 | 3 | 2 | 4 | 4 | 3 | 4 |
| 7 | 3 | 3 | 3 | s3 | s4 | s5 | s6 | 3 | s3 | s4 | s5 | s6 | 0 | 4 | 4 |
| 8 | 3 | 1 | 3 | s3 | s4 | s5 | s6 | 3 | s3 | s4 | s5 | s6 | 1 | 4 | 4 |
| 9 | s0 | s1 | 3 | s3 | 1 | 3 | 1 | 3 | s0 | s1 | s2 | s3 | 2 | 4 | 4 |
| 10 | s0 | s1 | s2 | s3 | 3 | 1 | 3 | 3 | s0 | s1 | s2 | s3 | 3 | 4 | 4 |
| 11 | Other values, not above | | | | | | | 4 | s0 | s1 | s2 | s3 | s4 | s5 | s6 |

*FIG. 15*

| Row # | Symbols from the Decoder ||||||| Priority | Replaced Symbols to the De-mapper |||||||
|---|---|---|---|---|---|---|---|---|---|---|---|---|---|---|---|
| | s0' | s1' | s2' | s3' | s4' | s5' | s6' | | s0 | s1 | s2 | s3 | s4 | s5 | s6 |
| 1 | s0' | s1' | 0 | 4 | 4 | 3 | 4 | 1 | s0' | 1 | 3 | 1 | 3 | 1 | s1' |
| 2 | s0' | s1' | 1 | 4 | 4 | 3 | 4 | 1 | s0' | 3 | 1 | 3 | 1 | 3 | s1' |
| 3 | s0' | 0 | 2 | 4 | 4 | 3 | 4 | 2 | 1 | 3 | 1 | s0' | 1 | 3 | 1 |
| 4 | s0' | 1 | 2 | 4 | 4 | 3 | 4 | 2 | 1 | 1 | 3 | s0' | 3 | 1 | 3 |
| 5 | s0' | 2 | 2 | 4 | 4 | 3 | 4 | 2 | 3 | 3 | 3 | s0' | 1 | 3 | 1 |
| 6 | s0' | 3 | 2 | 4 | 4 | 3 | 4 | 3 | 1 | 1 | 1 | s0' | 3 | 1 | 3 |
| 7 | s0' | s1' | s2' | s3' | 0 | 4 | 4 | 3 | 3 | 3 | 3 | s0' | s1' | s2' | s3' |
| 8 | s0' | s1' | s2' | s3' | 1 | 4 | 4 | 3 | s0' | s1' | s2' | s3' | s1' | s2' | s3' |
| 9 | s0' | s1' | s2' | s3' | 2 | 4 | 4 | 3 | s0' | s1' | s2' | s3' | s1' | 3 | 1 |
| 10 | s0' | s1' | s2' | s3' | 3 | 4 | 4 | 3 | s0' | s1' | s2' | s3' | 3 | 1 | 3 |
| 11 | Other values, not above ||||||| 4 | s0' | s1' | s2' | s3' | s4' | s5' | s6' |

*FIG. 16*

RUN-LENGTH DETECTION AND CORRECTION

CROSS-REFERENCE TO RELATED APPLICATIONS

This application claims priority to and the benefit of U.S. provisional patent application No. 61/863,686 filed on Aug. 8, 2013, and U.S. provisional patent application No. 61/943,959 filed on Feb. 24, 2014, the entire content of both applications being incorporated herein by reference.

BACKGROUND

1. Field

The present disclosure relates generally to high-speed data communications, and more particularly, to mappers and demappers used in multi-wire, multi-phase polarity encoders and decoders.

2. Background

High-speed interfaces are frequently used between circuits and components of mobile wireless devices and other complex apparatus. For example, certain devices may include processing, communications, storage and/or display devices that interact with one another through communications links. Some of these devices, including synchronous dynamic random access memory (SDRAM), may be capable of providing or consuming data and control information at processor clock rates. Other devices, such as display controllers, may require variable amounts of data at relatively low video refresh rates.

High-speed communications links are often provisioned with multiple parallel connectors. Clock recovery circuits rely on rated or specified transition times for edges on the communications links and variable rise times can lead to inter-symbol interference or tolerances values that limit speeds on the high-speed communications links. Variability in rise times is affected by a variety of conditions, including high run-lengths when the state of a wire does not change, allowing the voltage or current levels in the wire to increase beyond typical operating levels.

SUMMARY

Systems, methods and apparatus are disclosed herein that use an interface to a communications link having a number of connectors, where the interface may be configured to avoid long run-lengths. The communications link may be provided between two devices, which may be collocated in an electronic apparatus.

In an aspect of the disclosure, a data transfer method includes steps of determining that a run-length violation will occur or is likely to occur if a first sequence of symbols provided by a mapper of an M-Wire N-Phase encoder is transmitted on a plurality of wires, and substituting a second sequence of symbols for the first sequence of symbols. The second sequence of symbols may include a surplus sequence of symbols that is not used for mapping data in the mapper.

In an aspect of the disclosure, an encoding scheme used by the encoder may define a set of available sequences of symbols. The mapper may be configured to use a subset of the set of available sequences of symbols to map the data. The surplus sequence of symbols may be excluded from membership of the subset of the set of available sequences of symbols.

In an aspect of the disclosure, the second sequence of symbols may be substituted for the first sequence of symbols through the use of a table to select the second sequence of symbols based on the content of the first sequence of symbols.

The second sequence of symbols may be substituted for the first sequence of symbols by generating a plurality of replacement sequences that are not in the subset of the set of available sequences of symbols, and selecting as the second sequence of symbols, one of the plurality of replacement sequences which is calculated to be unlikely to cause the run-length violation. The second sequence of symbols may be substituted for the first sequence of symbols by generating a plurality of replacement sequences that are not in the subset of the set of available sequences of symbols, and selecting as the second sequence of symbols one of the plurality of replacement sequences that is unlikely to cause the run-length violation.

In an aspect of the disclosure, the run-length violation occurs if one or more of the plurality of wires fails to change state while a predefined number of symbols are sequentially transmitted on the plurality of wires. It may be determined that the run-length violation will occur by identifying a combination and/or sequence of symbols known to cause the run-length violation. The combination of symbols may include a predefined number of symbols. It may be determined that the run-length violation is likely to occur by identifying a portion of a combination of symbols known to cause the run-length violation at the beginning or end of the first sequence of symbols.

In an aspect of the disclosure, the second sequence of symbols is transmitted on the plurality of wires in place of the first sequence of symbols. Each of the first sequence of symbols and the second sequence of symbols may include seven symbols, for example, and 16 bits of data may be mapped to the first sequence of symbols. The symbols of the second sequence of symbols may be transmitted on the plurality of wires by transmitting a first symbol that causes a first wire and a second wire to be driven to signaling states that are different from one another. A third wire may be in a signaling state that is different from the signaling states of the first wire and the second wire. The signaling state of a wire may correspond to a voltage level.

In an aspect of the disclosure, an apparatus includes means for determining that a run-length violation will occur, or is likely to occur if a first sequence of symbols provided by a mapper of an M-Wire N-Phase encoder is transmitted on a plurality of wires, and means for substituting a second sequence of symbols for the first sequence of symbols. The second sequence of symbols may include a surplus sequence of symbols that are not used for mapping data in the mapper.

In an aspect of the disclosure, the apparatus includes means for transmitting the second sequence of symbols on the plurality of wires in place of the first sequence of symbols.

In an aspect of the disclosure, a non-transitory processor-readable storage medium has one or more instructions stored thereon which, when executed by at least one processing circuit, cause the at least one processing circuit to determine that a run-length violation will occur or is likely to occur if a first sequence of symbols provided by a mapper of an M-Wire N-Phase encoder is transmitted on a plurality of wires, and substitute a second sequence of symbols for the first sequence of symbols. The second sequence of symbols may include a surplus sequence of symbols that are not used for mapping data in the mapper.

In an aspect of the disclosure, a driver circuit includes an encoder configured to generate a sequence of symbols from data to be transmitted on a communications link, and a symbol sequence replacer configured to determine that a run-length violation will occur or is likely to occur if a first sequence of symbols provided by a mapper of an M-Wire N-Phase encoder is transmitted on a plurality of wires, and substitute a second sequence of symbols for the first sequence of symbols. The second sequence of symbols may include a surplus sequence of symbols that are not used for mapping data in the mapper. Each symbol may be characterized by a combination of a phase state and a polarity of a pair of connectors, and a selection of at least one undriven connector.

In an aspect of the disclosure, a data transfer method includes receiving a first set of symbols from a plurality of wires on a communications link at a demapper of an M-Wire N-Phase decoder, identifying the first set of symbols as a substitute set of symbols, and replacing the substitute set of symbols with a second set of symbols. The second set of symbols may correspond to symbols that would have caused, or that would likely have caused a run-length violation if transmitted on the plurality of wires. The first set of symbols may be identified as a substitute set of symbols when the first set of symbols is not defined for use in demapping symbols.

In an aspect of the disclosure, the run-length violation occurs when one or more of the plurality of wires fail to change state while a predefined number of symbols are sequentially transmitted on the plurality of wires. The run-length violation is likely to occur if the second set of symbols includes a portion of a combination of symbols known to cause the run-length violation at the beginning or end of the first set of symbols. Each of the first set of symbols and the second set of symbols may include seven symbols. The demapper may be configured to demap 16 bits of data from the second set of symbols.

In an aspect of the disclosure, a decoding scheme used by the M-Wire N-Phase decoder defines a set of valid sequences of symbols. The demapper may be configured to use a subset of the set of valid sequences of symbols that does not include the first set of symbols.

In an aspect of the disclosure, an apparatus includes means for receiving a first set of symbols from a plurality of wires on a communications link at a demapper of an M-Wire N-Phase decoder, means for identifying the first set of symbols as a substitute set of symbols, and means for replacing the substitute set of symbols with a second set of symbols. The second set of symbols may correspond to symbols that would have caused, or that would likely have caused a run-length violation if transmitted on the plurality of wires. The first set of symbols may be identified as a substitute set of symbols when the first set of symbols is not defined for use in demapping symbols.

In an aspect of the disclosure, a non-transitory processor-readable storage medium has one or more instructions which, when executed by at least one processing circuit, cause the at least one processing circuit to receive a first set of symbols from a plurality of wires on a communications link at a demapper of an M-Wire N-Phase decoder, identify the first set of symbols as a substitute set of symbols, and replace the substitute set of symbols with a second set of symbols. The second set of symbols may correspond to symbols that would have caused, or that would likely have caused a run-length violation if transmitted on the plurality of wires. The first set of symbols may be identified as a substitute set of symbols when the first set of symbols is not defined for use in demapping symbols.

In an aspect of the disclosure, a receiver for decoding M-wire, N-phase polarity encoded symbols includes a symbol sequence replacer configured to receive a first set of symbols from a plurality of wires on a communications link at a demapper of an M-Wire N-Phase decoder, identify the first set of symbols as a substitute set of symbols, and replace the substitute set of symbols with a second set of symbols. The second set of symbols may correspond to symbols that would have caused, or that would likely have caused a run-length violation if transmitted on the plurality of wires. The first set of symbols may be identified as a substitute set of symbols when the first set of symbols is not defined for use in demapping symbols.

BRIEF DESCRIPTION OF THE DRAWINGS

FIG. 15 illustrates a symbol substitution scheme in a transmitter according to certain aspects disclosed herein.

FIG. 16 illustrates a symbol restoration scheme in a receiver according to certain aspects disclosed herein.

DETAILED DESCRIPTION

Figure 1:
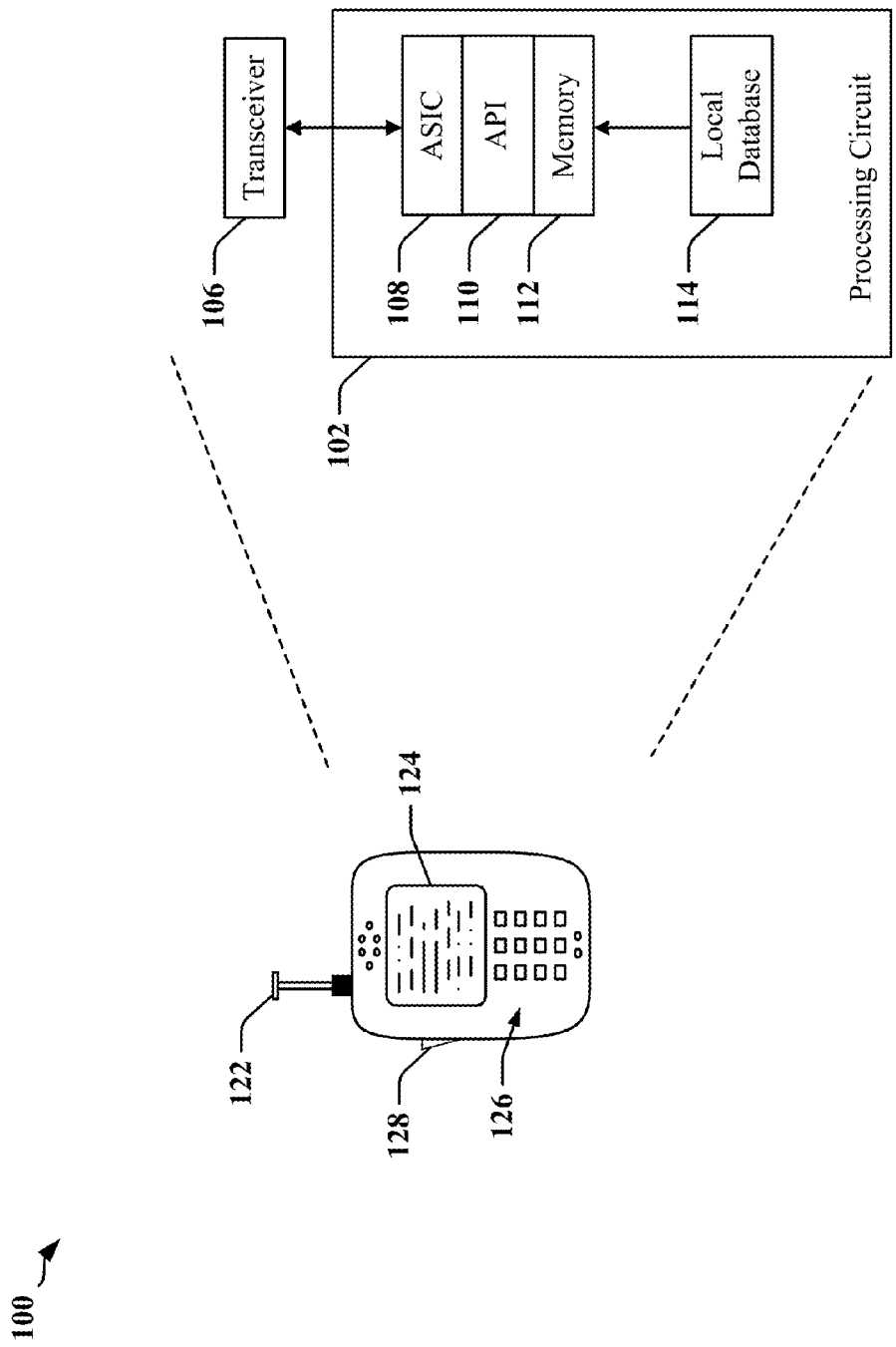
FIG. 1 depicts an apparatus that employs an N-phase polarity encoded data link between devices within the apparatus.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain disclosed examples relate to systems and apparatus that employ multi-phase data encoding and decoding methods involving a plurality of conductors (i.e., M conductors or wires). The M conductors typically include three or more conductors, and each conductor may be referred to as a wire, although the M conductors may include conductive traces on a circuit board or within a conductive layer of a semiconductor integrated circuit (IC) device. The M conductors may be divided into a plurality of transmission groups, each group encoding a portion of a block of data to be transmitted. An N-phase encoding scheme is defined in which bits of data may be encoded in transitions in signaling state of the M conductors, including phase transitions and polarity changes on the M conductors. The signaling state of the M conductors may correspond to and/or be defined by a sequence of symbols in which data is encoded. A transition in signaling state of at least one of the M conductors occurs at the symbol boundary between each pair of consecutive symbols. In one example, an N-phase encoding scheme for a 3-wire system may include three phase states and two polarities, providing 6 states with 5 possible transitions from each state. Deterministic voltage and/or current changes may be detected and decoded to extract data from the M conductors. Decoding need not rely on clock signals transmitted on independent conductors or pairs of conductors, and timing information may be derived directly from phase and/or polarity transitions in the M conductors. N-Phase polarity encoding can be employed for data transfer in different types of interface, including interfaces that use electrical, optical and radio frequency (RF) signaling, for example.

Certain aspects of the invention may be applicable to communications links deployed between electronic components, which may include subcomponents of devices such as telephones, mobile computing devices, appliances, automobile electronics, avionics systems, etc. Referring to FIG. 1, for example, an apparatus 100 employing M-wire, N-phase encoding may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through an RF communications transceiver 106 with a radio access network (RAN), a core access network, the Internet and/or another network. The communications transceiver 106 may be operably coupled to the processing circuit 102. The processing circuit 102 may include one or more IC devices, such as an application specific IC (ASIC) 108. The ASIC 108 may include one or more processing devices, logic circuits, and so on. The processing circuit 102 may include and/or be coupled to processor readable storage 112 that may maintain instructions and data that may be executed by a processing device in the processing circuit 102. The processing circuit 102 may be controlled by an operating system and/or an application programming interface (API) 110 layer that supports and enables execution of software modules residing in the storage 112 of the wireless device. The storage 112 may include read-only memory (ROM), random-access memory (RAM), electrically erasable programmable read-only memory (EEPROM), a flash memory device, and/or any other type of memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
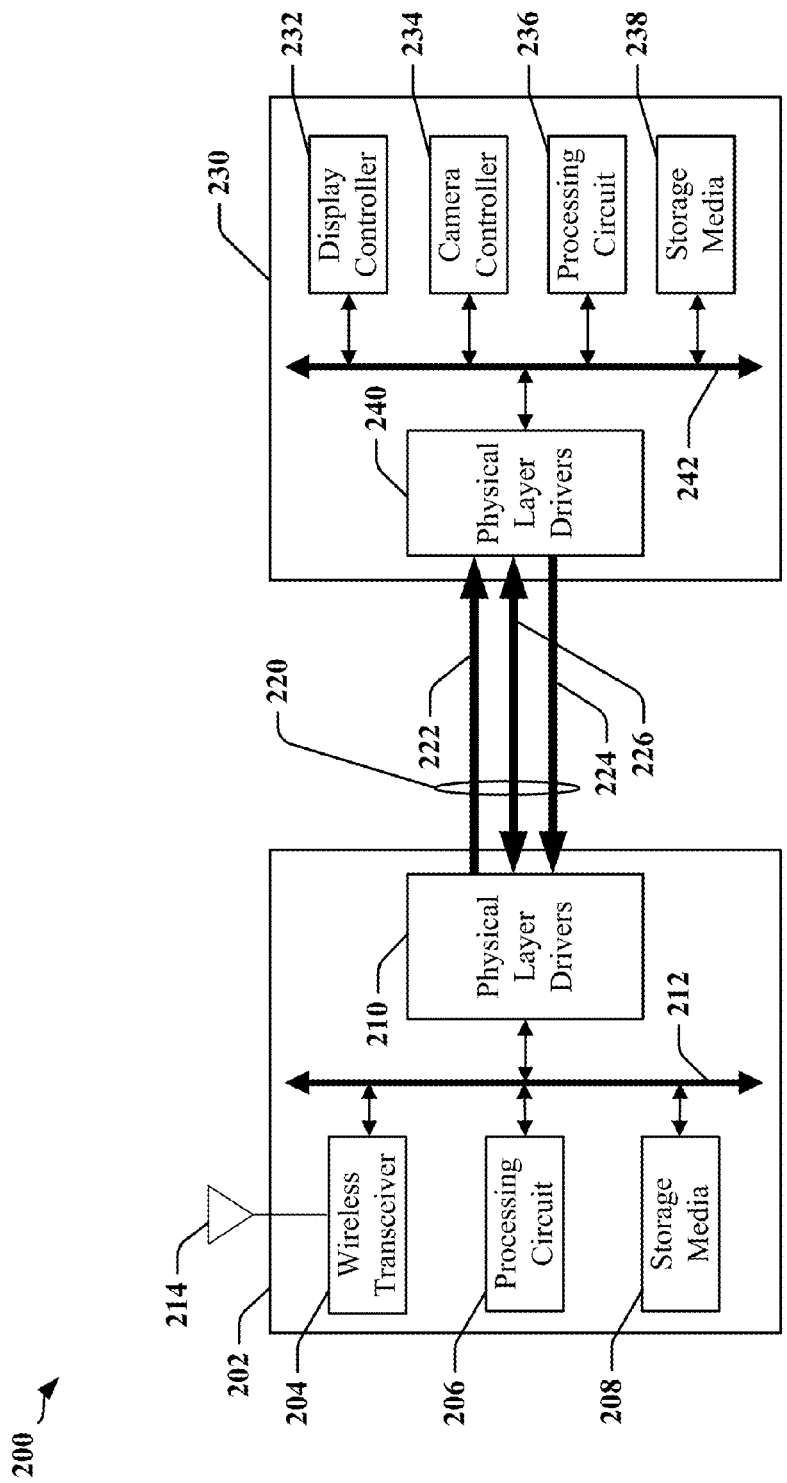
FIG. 2 illustrates a system architecture for an apparatus employing an N-phase polarity encoded data link.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, a gaming device, an appliance, a vending machine, a wearable computing device such as a smart watch, or the like. The apparatus 200 may include a plurality of IC devices 202 and 230 that exchange data and control information through a communications link 220. The communications link 220 may be used to connect IC devices 202 and 230 that are located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or optical connection.

The communications link 220 may include multiple channels 222, 224 and 226. One or more channels 226 may be bidirectional, and may operate in half-duplex and/or full-duplex modes. One or more channel 222 and/or 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. A first IC device 202 or 230 may be designated as a host, master and/or transmitter, while the second IC device 230 or 202 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor and/or processing circuit 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, biometric readers, or other input/output devices. The display controller 232 may include circuits and software drivers that support a display such as a liquid crystal display (LCD) panel, a touch-screen display, an indicator and so on. The storage media 208 and/or 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as data transfer rate and/or clocking rates. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers, which may be provided in the transceivers 210, 240 for example. The use of a clocking signal that is a derivative of the symbol clock may enable fast start and stop of data signals without the need for framing to enable training and synchronization.

In certain examples, a single bidirectional link 226 may support communications between a first processing device 202 and a second processing device 230. In certain instances, the first processing device 202 and the second processing device 230 provide encoding and decoding of data, address and control signals transmitted between a processing device and memory devices such as dynamic random access memory (DRAM).

In one example, one or more of buses 212 and/or 242 may provide access to double data rate (DDR) SDRAM using M-wire, N-phase encoding technique. N-phase polarity encoding physical layer devices 210 and/or 240 can encode multiple bits per transition, and multiple sets of wires can be used to transmit and receive data from the SDRAM, control signals, address signals, and so on.

In another example, the communication link 220 includes a high-speed digital interface, such as a mobile display digital interface (MDDI), and one or more data links 222, 224 and 226 may use N-phase polarity encoding. The transceivers 210 and 240 may encode and decode data transmitted on the communications link 220. The use of N-phase polarity encoding enables high speed data transfer that may consume half or less of the power of other interfaces because fewer drivers are active in the N-phase polarity encoded data links 220. The N-phase polarity encoding devices 210 and/or 240 can encode multiple bits per transition on the interface, which may include a bus. In one example, a combination of 3-phase and polarity encoding may be used to support a wide video graphics array (WVGA) 80 frames per second LCD driver IC without a frame buffer, delivering pixel data at 810 Mbps for display refresh.

Figure 3:
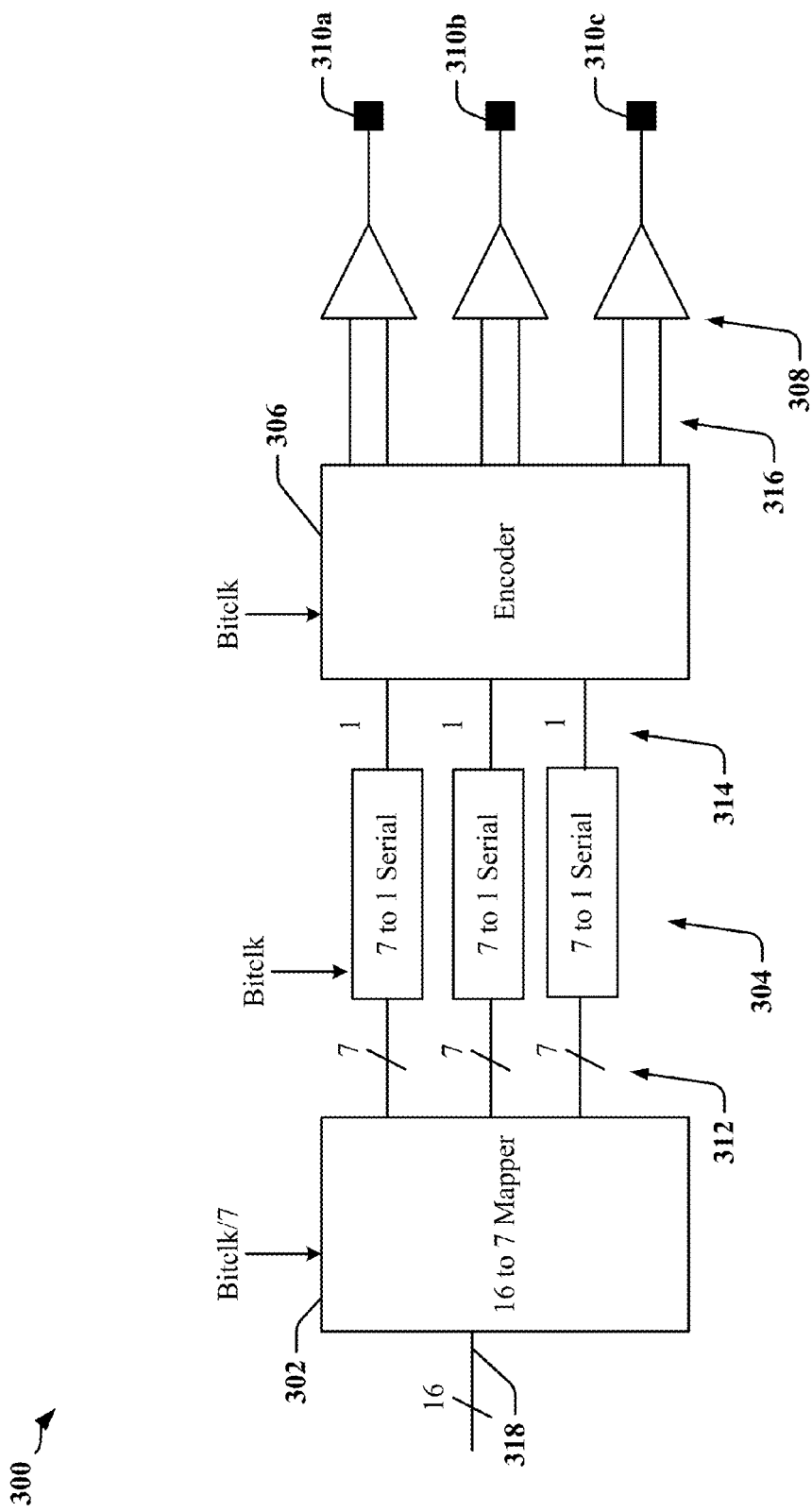
FIG. 3 illustrates an example of an N-phase polarity data encoder.

FIG. 3 is a block schematic diagram illustrating an example of an M-wire, N-phase polarity encoding transmitter 300 configured for M=3 and N=3. The example of S-wire, 3-phase encoding is used solely for the purpose of simplifying descriptions of certain aspects of this disclosure. The principles and techniques disclosed for 3-wire, 3-phase encoders can be applied in other configurations of M-wire, N-phase polarity encoders.

When 3-phase polarity encoding is used, connectors such as signal wires 310a, 310b, and 310c on a 3-wire bus may be undriven, driven positive, or driven negative. An undriven signal wire 310a, 310b or 310c may be in a high-impedance state. An undriven signal wire 310a, 310b or 310c may be driven or pulled to a voltage level that lies substantially halfway between the positive and negative voltage levels provided on driven signal wires. An undriven signal wire 310a, 310b or 310c may have substantially no current flowing through it. In the depicted transmitter 300, a set of drivers 308 may cause each signal wire 310a, 310b and 310c to be in one of three signaling states (denoted as +1, −1, and 0 states) for every transmitted symbol. In each symbol interval during which a symbol is transmitted, at least one signal is in the undriven (0) state, while the number of signals driven positive (+1) state is equal to the number of signals driven negative (−1) state, such that the sum of current flowing to the receiver is always zero.

Each pair of symbols in a sequence of symbols to be transmitted on the signal wires 310a, 310b, and 310c may be encoded such that the signaling state of at least one signal wire 310a, 310b or 310c changes after the symbol boundary between the pair of consecutive symbols.

In one example, the drivers 308 may include unit-level current-mode drivers. In another example, the drivers 308 may include voltage-mode drivers. In the latter example, the drivers 308 may be adapted or configured to drive two of the signal wires 310a, 310b, and/or 310c using opposite polarity voltages while the third signal wire 310a, 310b, or 310c is at high impedance and/or pulled to ground during each symbol interval.

In the depicted transmitter 300, 16-bit data 318 is input to a mapper 302, which maps the input data 318 to 7 symbols 312 for transmitting sequentially over the signal wires 310a, 310b and 310c. The 7 symbols 312 may be serialized, using parallel-to-serial converters 304, for example. An M-wire, N-phase encoder 306 receives the serialized symbols 314 provided by the parallel-to-serial converters 304, and computes the state of each signal wire 310a, 310b and 310c during a time period corresponding to each symbol transmission interval. The encoder 306 selects the states of the signal wires 310a, 310b and 310c based on the input symbol and the previous states of signal wires 310a, 310b and 310c.

The use of M-wire, N-phase encoding permits a number of bits to be encoded in a plurality of symbols where the bits per symbol is not an integer. In the simple example of the 3-wire, 3-phase system, there are 3 available combinations of 2 wires that may be driven simultaneously, and 2 possible combinations of polarity on the pair of simultaneously driven wires, yielding 6 possible states. Since the signaling state of at least one signal wire 310a, 310b and/or 310c changes between consecutive symbol intervals, 5 of the 6 states are available at every symbol boundary. The availability of 5 states at each symbol boundary permits $\log_2(5) \cong 2.32$ bits to be encoded per symbol. Accordingly, a mapper may accept a 16-bit word and convert it to 7 symbols, because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
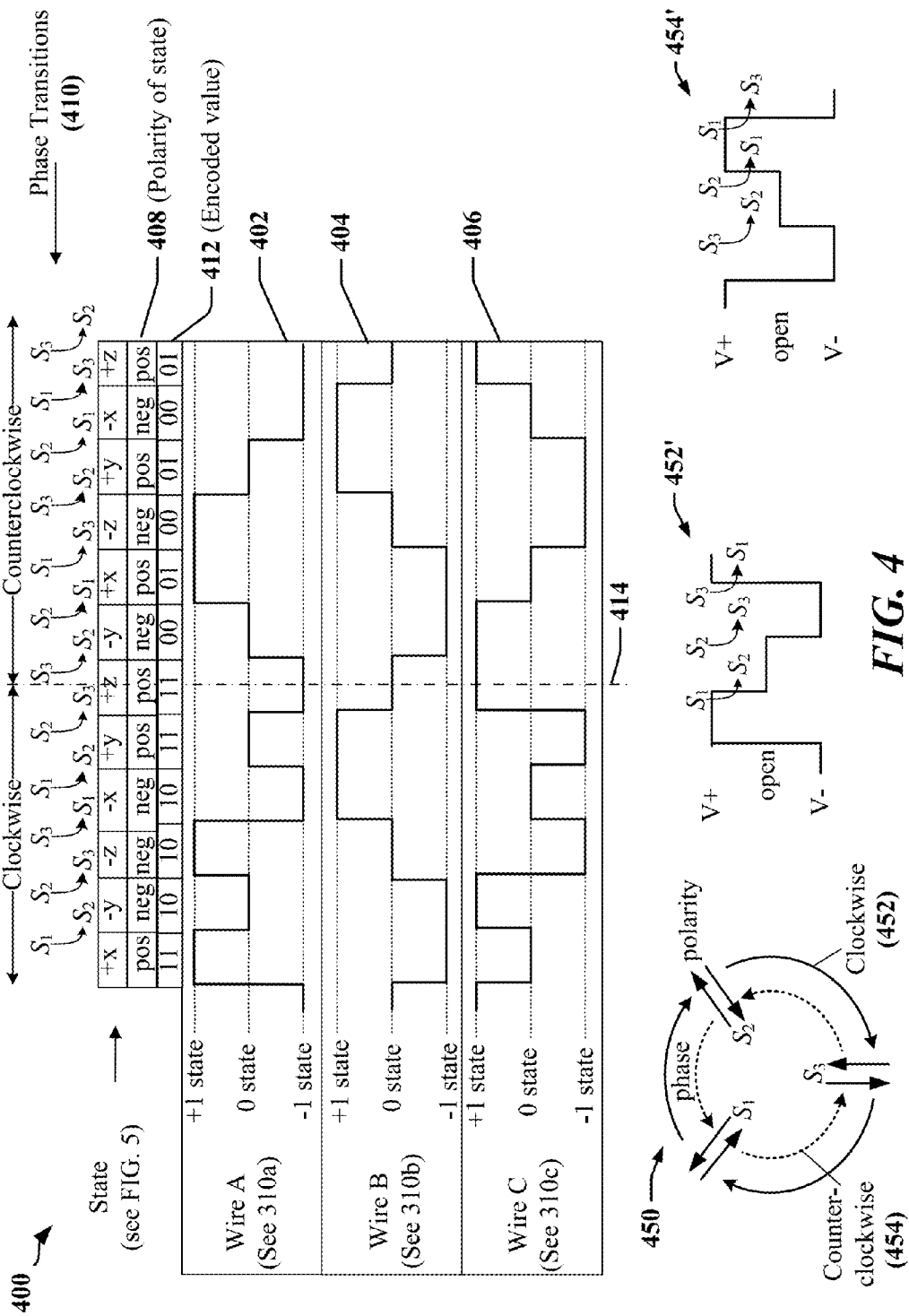
FIG. 4 illustrates signaling in an N-phase polarity encoded interface.

FIG. 4 illustrates an example of signaling 400 employing a three-phase modulation data-encoding scheme based on the circular state transition diagram 450. According to the data-encoding scheme, a three-phase signal may rotate in two directions and may be transmitted on three conductors 310a, 310b and 310c. Each of the three signals is independently driven on the conductors 310a, 310b, 310c. Each of the three signals includes the three-phase signal, with each signal being 120 degrees out of phase relative to the other two signals. At any point in time, each of the three conductors 310a, 310b, 310c is in a different one of the states $\{+1, 0, -1\}$. At any point in time, each of the three conductors 310a, 310b, 310c in a 3-wire system is in a different state than the other two wires. When more than three conductors or wires are used, two or more pairs of wires may be in the same state. The illustrated encoding scheme may also encode information in the polarity of the two conductors 310a, 310b and/or 310c that are actively driven to the +1 and −1 states. Polarity is indicated at 408 for the sequence of states depicted.

At any phase state in the illustrated three-wire example, exactly two of the conductors 310a, 310b, 310c carry a signal which is effectively a differential signal for that phase state, while the third conductor 310a, 310b or 310c is undriven. The phase state for each conductor 310a, 310b, 310c may be determined by voltage difference between the conductor 310a, 310b or 310c and at least one other conductor 310a, 310b and/or 310c, or by the direction of current flow, or lack of current flow, in the conductor 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a three-wire, three-phase communications link, clockwise rotations ($S_1$ to $S_2$), ($S_2$ to $S_3$), and/or ($S_3$ to $S_1$) at a state transition may be used to encode a logic 1, while counter-clockwise rotations ($S_1$ to $S_3$), ($S_3$ to $S_2$), and/or ($S_2$ to $S_1$) at the state transition may be used to encode a logic 0. Accordingly a bit may be encoded at each transition by controlling whether the signal is "rotating" clockwise or counter-clockwise. For example, a logic 1 may be encoded when the three wires 310a, 310b, 310c transition from phase state $S_1$ to phase state $S_2$ and a logic 0 may be encoded when the three wires 310a, 310b, 310c transition from phase state $S_1$ to phase state $S_3$. In the simple three-wire example depicted, direction of rotation may be easily determined based on which of the three wires 310a, 310b, 310c is undriven before and after the transition.

Information may also be encoded in the polarity and/or changes of polarity of the driven conductors 310a, 310b, 310c, or in the direction of current flow or changes in the direction of current flow between two conductors 310a, 310b, 310c. Signals 402, 404, and 406 illustrate voltage levels applied to conductors 310a, 310b, 310c, respectively at each phase state in a three-wire, three-phase link. At any time, a first conductor 310a, 310b, 310c is coupled to a more positive voltage (+V, for example), a second conductor 310a, 310b, 310c is coupled to a more negative voltage (−V, for example), while the third conductor 310a, 310b, 310c may be open-circuited. As such, one polarity encoding state may be determined by the current flow between the first and second conductors 310a, 310b, 310c or the voltage polarities of the first and second conductors 310a, 310b, 310c. In some embodiments, two bits of data may be encoded at each phase transition. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the conductors 310a, 310b, 310c. The decoder having determined direction of rotation can determine the phase state and the polarity of the voltage applied between the two active connectors 310a, 310b and/or 310c, or the direction of current flow through the two active conductors 310a, 310b and/or 310c.

In the example of the three-wire, three-phase link described herein, one bit of data may be encoded in the rotation, or phase change in the three-wire, three-phase link, and an additional bit may be encoded in the polarity or changes in polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

Figure 5:
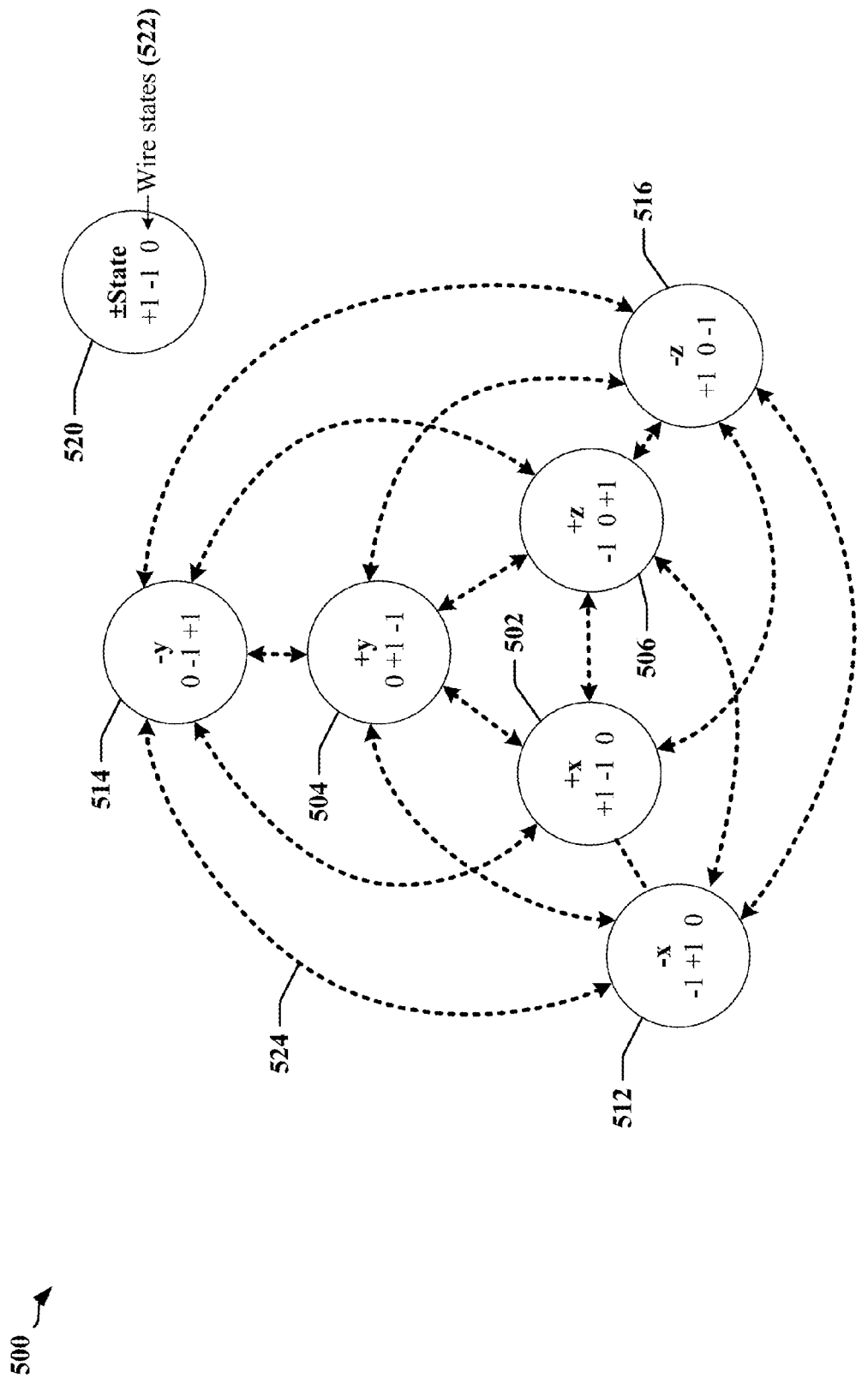
FIG. 5 is a state diagram illustrating state transitions in the example of a 3-wire, 3-phase communication link.

FIG. 5 is a state diagram 500 illustrating 6 states and 30 possible state transitions in the example of a 3-wire, 3-phase communication link. FIG. 5 expands on the state transition diagram 450 in FIG. 4 by depicting all possible states 502, 504, 506, 512, 514 and 516. These states 502, 504, 506, 512, 514 and 516 include positive polarity and negative polarity versions of the phase states $S_1$, $S_2$ and $S_3$ illustrated in the phase transition diagram 450 of FIG. 4. For clarity, the set of phase/polarity states are labeled alphabetically and includes $\{+x, -x, +y, -y, +z, -z\}$ where, for example, +x and −x represent states with the same phase state but different polarity. As shown in the model state element 520, each state 502, 504, 506, 512, 514 and 516 in the state diagram 500 includes a field 522 showing the voltage state of signals 402, 404 and 406, which are transmitted on wires 310a, 310b and 310c, respectively. For example, in state 502 (+x) signal 402=+1, signal 404=−1 and signal 406=0. Also shown in FIG. 5 are the 5 possible transition paths from each of the states 502, 504, 506, 512, 514 and 516, including by way of example, the transition path 524 between −x state 512 and −y state 514.

Figure 6:
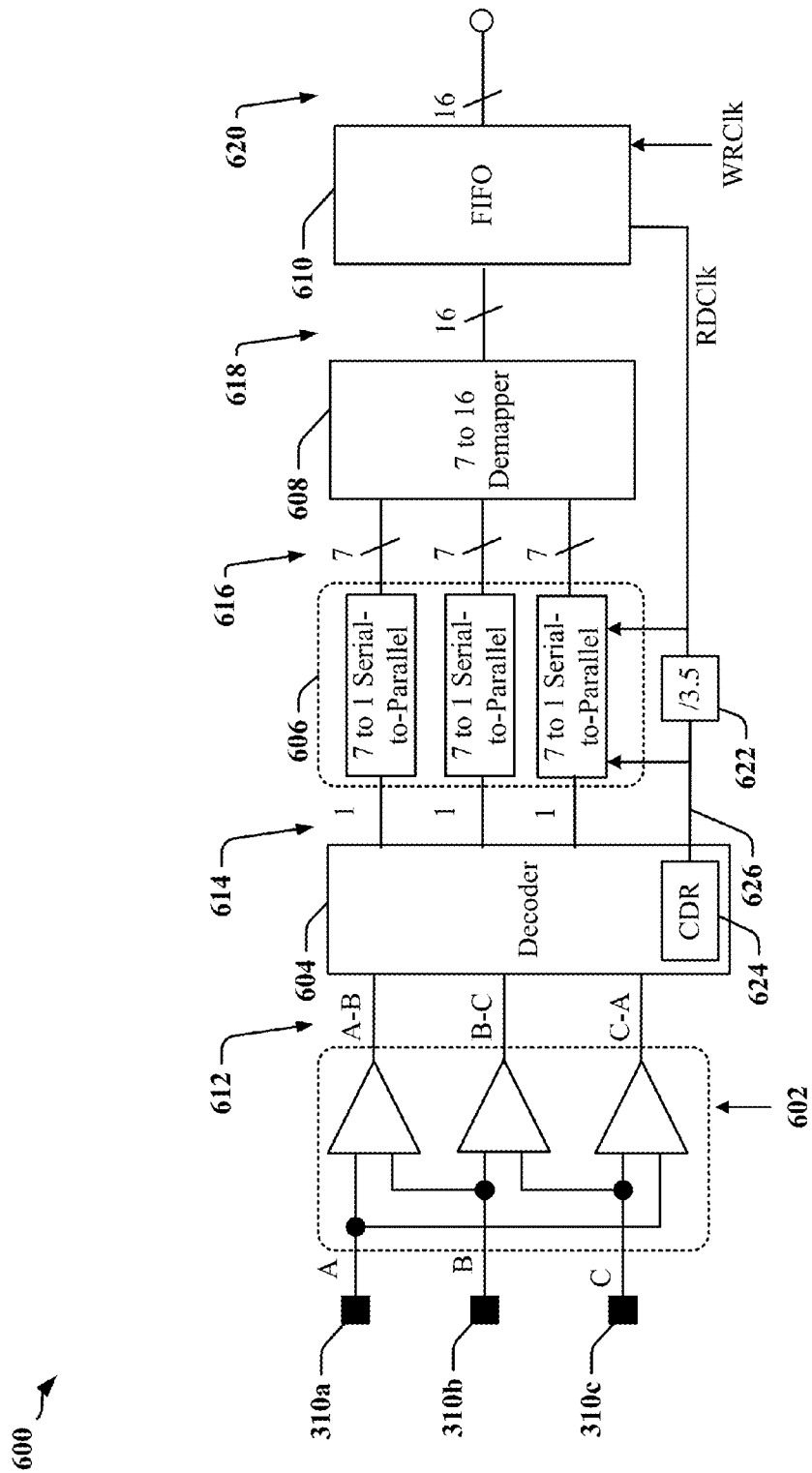
FIG. 6 illustrates a 3-phase polarity data decoder.

FIG. 6 is a block schematic diagram illustrating an example of a receiver 600 that may be used to decode data from M-wire, N-phase polarity encoded signals. The receiver 600 may include a set of differential receivers 602, configured to monitor the different possible pairs of wires and/or connectors 310a, 310b, and/or 310c. In one example, the differential receivers 602 may operate as comparators that produce an output representative of a difference in voltage between two of the three connectors 310a, 310b, 310c. A decoder 604 may be configured to receive the outputs 612 of the differential receivers 602, and the decoder 604 may be adapted or configured to provide a sequence of symbols 614 which are derived based on the signaling state of each of three connectors 310a, 310b, 310c in a current symbol transmission interval, and changes in the signaling state of the three connectors 310a, 310b, 310c relative to an immediately preceding symbol transmission interval.

The differential receivers 602 may compare the voltage between pairs of connectors 310a, 310b, and/or 310c in order to determine the signaling state of each connector 310a, 310b, or 310c. A clock and data recovery (CDR) circuit 624 may generate a symbol clock 626 by detecting the occurrence of a transition in the output of at least one of the differential receivers 602. The CDR circuit 624 may capture raw symbols representative of the signaling state of the connectors 310a, 310b, 310c. Seven consecutive raw symbols 614 may be assembled by serial-to-parallel convertors 606, which produce sets of 7 raw symbols 616 to be processed by a demapper 608. The demapper may generate 16-bit data 618 from each sequence of 7 raw symbols 616 based on the value of each raw symbol and its immediate predecessor. The 16-bit data 618 may be buffered in the FIFO 610, which may be accessed by external devices to retrieve output 16-bit data words 620.

With reference also to FIG. 5, Table 1 illustrates the operation of the differential receivers 602. In the example, the wire states may be encoded in the voltage amplitude on the three wires 310a, 310b, and 310c such that a +1 state of a wire is represented as a voltage +V volts, a −1 state of the wire is represented as 0volts and the undriven state is represented or approximated as +V/2 volts. Table 1 illustrates the outputs of the differential receivers 602 for each state in the 3-wire 3-Phase Polarity encoding system. A receiver/decoder 922 (see FIG. 9) may be configured to output a code at the digital output of the receiver/decoder 922 for each symbol decoded.

708. The mapping scheme may determine a configuration for the N-wire bus 708. In one example, a plurality of connectors in the N-wire bus 708 may carry the same N-phase signal, shifted by a predetermined phase angle. In another example, the N-wire bus 708 may be subdivided into groups of G wires, where each group carries different N-phase signals. In the latter example, a 9-wire bus 708 may be configured as three different 3-wire bus segments. According to certain aspects, the mapper 704 may be adapted to dynamically define the encoding scheme, to reconfigure the N-wire bus 708 and to control the operation of the M-phase, N-wire driver 706. In one example, the mapper 704 may be adapted to reconfigure the M-wire, N-phase encoding system to provide a desired bandwidth and/or to limit power consumption. Thus, the mapper 704 may selectively enable and disable portions of the N-wire bus 708 when demand on data bandwidth is low, and the mapper 704 may enable additional portions of the N-wire bus 708 to obtain increased bandwidth.

At the receiver, N-phase symbols are received and accumulated from the N-wire bus 708, typically over a plurality of transmission clock cycles. The accumulated symbols may then be decoded by a symbol-to-bits mapper 712. Transmit clocks may be derived from one or more portions of the N-wire bus 708 and configuration information may be communicated using a designated group of connectors that provide a primary channel. In the example of a 9-wire bus 708 that is configured with three different 3-wire bus segments, one bus segment may be identified as the primary channel with a default encoding scheme to be used during power-up and synchronization. Commands communicated over the bus may cause the transmitter and receiver to enter a hibernate stage on one or more of the 3-wire segments.

N-Phase data transfer may use more than three signal wires or other connectors in provided in a communication medium. The use of additional signal wires that can be driven simultaneously provides more combinations of states and polarities and allows more bits of data to be encoded at each transition between states. This can significantly improve throughput of the system, while limiting power consumption as opposed to communications links that use multiple differential pairs to transmit data bits, while providing increased bandwidth. Power consumption can be further limited by dynamically configuring the number of active connectors for each transmission.

Figure 8:
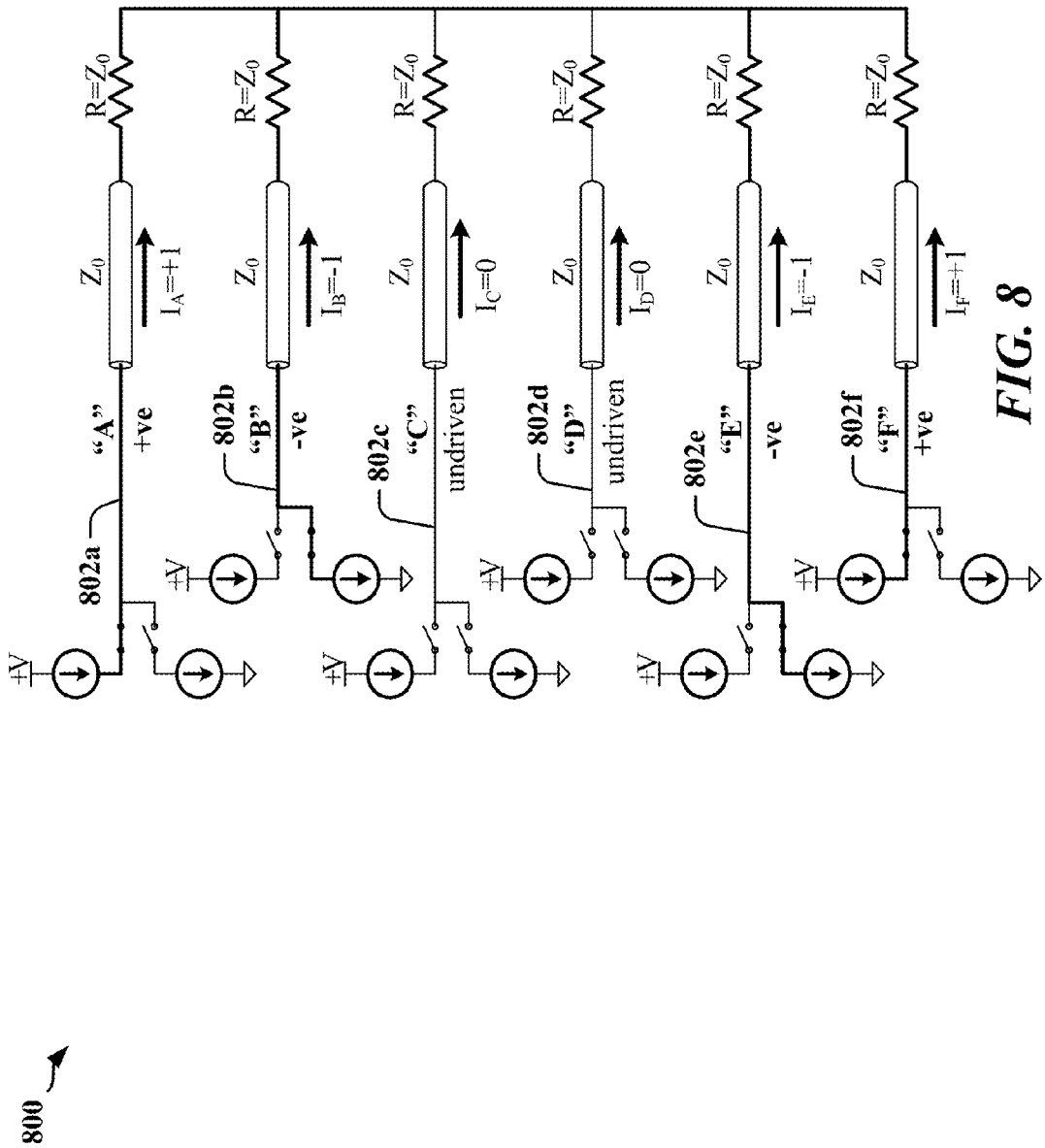
FIG. 8 is a schematic drawing showing a model of an encoder that transmits symbols using 6 wires with 2 pairs of wires driven for each state.

FIG. 8 is a schematic drawing showing an illustrative model 800 of a driver circuit in an encoder that transmits symbols using 6 wires with 2 pairs of wires driven for each state. Each circuit 802a-802f may be selectively connected to

TABLE 1

| State | Wire amplitude | | | Differential Rx output | | | Receiver Digital Output | | |
|---|---|---|---|---|---|---|---|---|---|
| | A | B | C | A − B | B − C | C − A | Rx_AB | Rx_BC | Rx_CA |
| +x | +V | 0 | +V/2 | +V | −V/2 | −V/2 | 1 | 0 | 0 |
| −x | 0 | +V | +V/2 | −V | +V/2 | +V/2 | 0 | 1 | 1 |
| +y | +V/2 | +V | 0 | −V/2 | +V | −V/2 | 0 | 1 | 0 |
| −y | +V/2 | 0 | +V | +V/2 | −V | +V/2 | 1 | 0 | 1 |
| +z | 0 | +V/2 | +V | −V/2 | −V/2 | +V | 0 | 0 | 1 |
| −z | +V | +V/2 | 0 | +V/2 | +V/2 | −V | 1 | 1 | 0 |

Figure 7:
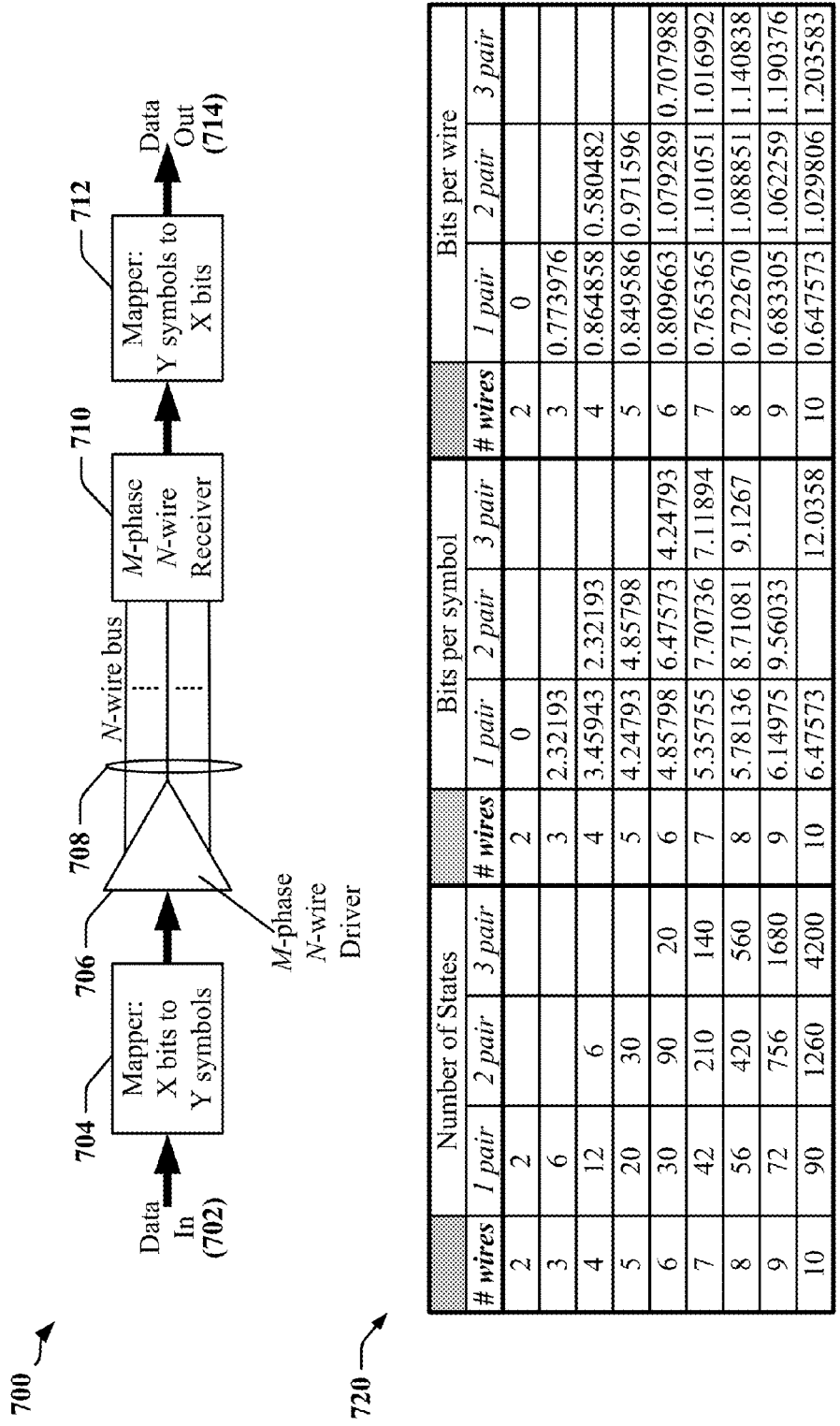
FIG. 7 illustrates an M-wire, N-phase encoding system and scheme.

FIG. 7 includes a block schematic diagram 700 illustrating certain aspects of an M-wire, N-phase encoding system and bit encoding capabilities for various values of M and configurations of the M-wire, N-phase encoding system. Data received at a transmitter may be mapped to a number of symbols to be sequentially transmitted over an N-wire bus a positive current source, a negative current source, or no current source. In the example, the 6 circuits 802a-802f labeled A through F are controlled such that, in one state, two circuits 802a and 802f (A and F) provide a positive current and two other circuits 802b and 802e (B and E) provide a negative current while the remaining two circuits 802c and

820d (C and D) provide no current. The positive currents provided by the A and F circuits 802a and 802f are canceled by the negative currents provided by the B and E circuits 802b and 802e. In the example the N-phase signal may have 3 phases, and each phase state can have a positive or negative polarity. The circuits 802a-802f may have an impedance $Z_0$ that is selected to match the characteristic impedance of the transmission lines, wires or connectors driven by the circuits 802a-802f.

For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| A B C D | A B C E | A B C F | A B D E | A B D F |
|---------|---------|---------|---------|---------|
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| + + − − | + − − + | + − + − | − + − + | − + + − | − − + + |
|---------|---------|---------|---------|---------|---------|

Accordingly, the total number of different states may be calculated as 15×6=90. To guarantee a transition between successive symbols, 89 states are available for transition from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

FIG. 7 includes a chart 720 that shows bit encoding for various values of M (i.e. number of wires) and configurations of wires and wire pairs.

N-Phase Polarity coding may be susceptible to certain issues attributable to run-length violations, which may arise when one or more wires remain in the same signaling state for an excessive number of successive symbols. In the example of a 3-Phase Polarity encoder, conventional mapping and encoding can produce consecutive states on the trio of wires that cause one of the wires to remain in the same state for many consecutive symbols. When one of the three wires is held at a constant value for too long, certain undesirable effects may result, including increased inter-symbol interference (ISI). The number of consecutive states in which a wire has the same value (voltage or current flow) may be referred to as "run-length" and a run-length of N may describe a condition in which a wire remains in the same voltage or current state for N symbols. Prolonged run-lengths may affect the switching time as capacitances accumulate charge and/or as current builds in inductances. Increased switching times can lead to constraints on maximum symbol frequency because the time during which the wires of an N-Phase communications link are stable and available for sampling is reduced.

Figure 9:
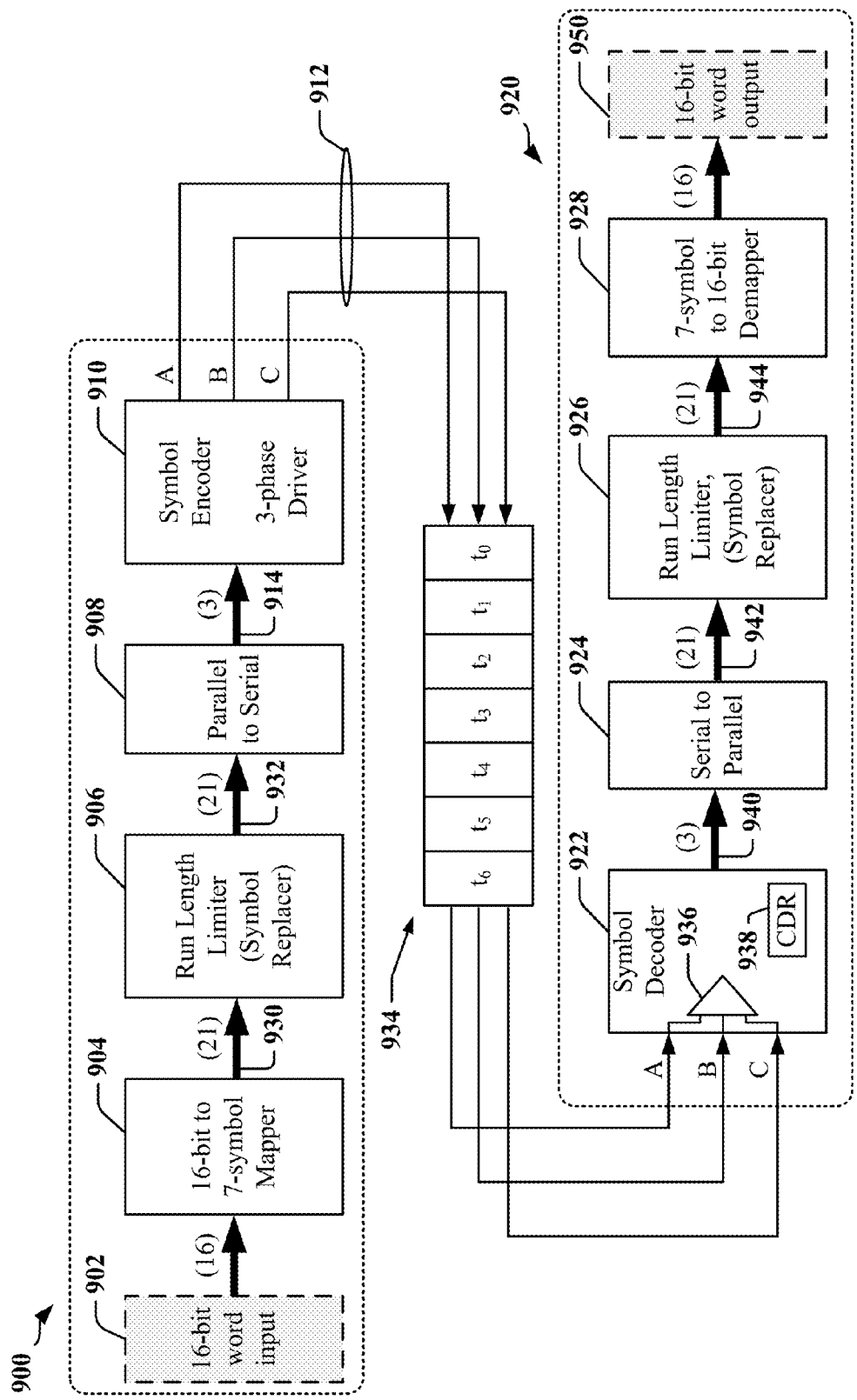
FIG. 9 illustrates illustrating an example of a transmitter and a receiver configured to limit run-length in a 3-Phase Polarity communications link.

FIG. 9 is a block diagram illustrating an example of a transmitter 900 and a receiver 920 that can be configured to limit run-length in a 3-Phase Polarity communications link. A 16-bit word 902 is received as an input to the Symbol Mapper 904. In the example of 3-wire, 3-Phase Polarity encoding, the Mapper 904 converts the 16 bit word 902 to seven symbols 930 to be transmitted over 3 wires. The seven symbols 930 may include a set of 21 bits organized as seven 3-bit symbols. The seven symbols 930 may be provided to a module or circuit 906 configured to limit run-length by selectively substituting symbols in the seven symbols 930 received from the Symbol Mapper 904 and to produce a run-length limited set of seven symbols 932. This latter set of seven symbols 932 may be provided to a parallel-to-serial converter 908, which converts the 21 bits of the seven symbols 932 into a sequence of symbols 914 for transmission on the three wires 912. The sequence of symbols 914 is encoded by the symbol encoder 910 which defines the state of the three wires 912, labeled A, B and C, in each of a sequence of symbol transmission intervals 934.

At the receiver 920, a symbol receiver/decoder 922 may include a set of differential receivers 936 and a CDR 938, which may cooperate to produce a receiver clock and to decode a sequence of seven raw 3-bit symbols 940 based on the signaling states and transitions in signaling state of the three wires 912 during the sequence of symbol transmission intervals 934. The receiver 920 may include a serial-to-parallel convertor 924 that converts the sequence of seven raw symbols 940 to a set of 21 bits 942 organized as seven 3-bit symbols. A module or circuit 926 may be adapted or configured to receive the set of 21 bits 942 and to produce a modified set of 21 bits 944 after reversing symbol substitutions that may have been performed by the run-length limiting module or circuit 906 in the transmitter 900. A Demapper 928 may then convert the 7 symbols in the modified set of 21 bits 944 to a 16 bit word, which may be provided as an output 950 of the receiver 920.

Each symbol detected by the receiver 920 can be represented using a 3-bit raw symbol value, having one of five possible values: 000, 001, 010, 011 and 100. The value of the raw symbol value is defined by: {Same_Phase, delta_Phase, delta_Polarity}. Each of the three bits represents a change or no change from the previous wire state to the present wire state. This representation simplifies the detection of symbol sequences that produce run-lengths greater than a maximum number of symbols, because only these symbol values need to be examined rather than the many different wire states that can result in a run-length that exceeds a threshold maximum value.

Figure 10:
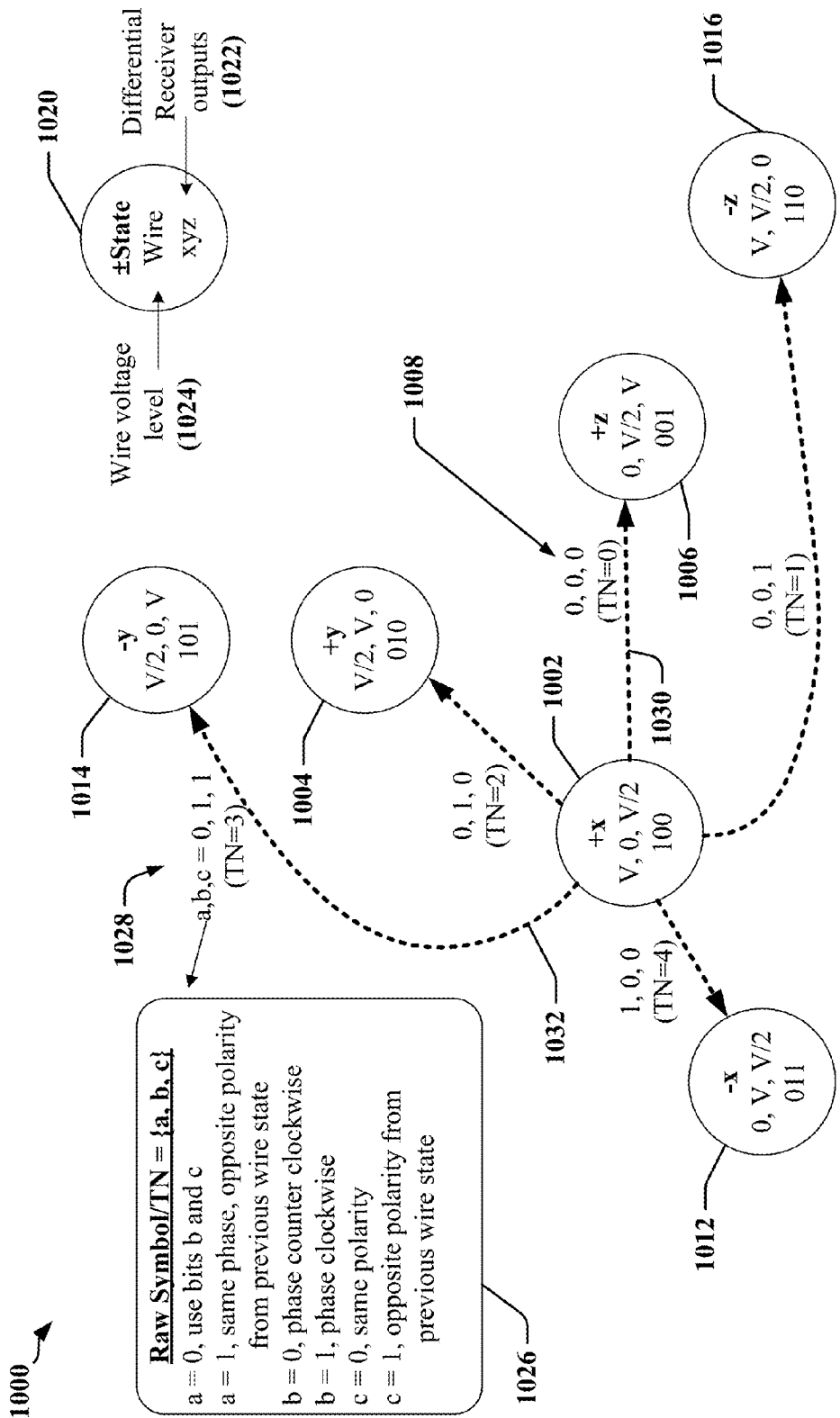
FIG. 10 is a state diagram illustrating all possible transitions from one state.

FIG. 10 is a state diagram 1000, illustrating all possible transitions from the +x state 1002, with annotations corresponding to the raw symbol values generated at a receiver. The raw symbol values (see annotation 1026) associated with each transition line include the raw symbol value 1008 on the transition line 1030 between states +x and +z and the raw symbol value 1028 on the transition line 1032 between states +x and −y. Each state 1002, 1004, 1006, 1012, 1014, 1016 is represented as a circle, which is identified by its name (e.g. +x, −x, +y, −y, +z, −z), and annotated as shown in the model state 1020. In particular, wire voltage levels 1024 are shown together with the state of the differential receiver outputs 612. Transitions to three of the five states, namely the −y state 1014, the −z state 1016 and the −x state 1012 result in no change to one of the three wires on those particular state transitions. The other two state transitions, namely to the +y state 1004 and the +z state 1006 result in voltage changes on all three wires, and consequently no potential run-length issues are anticipated or likely when one of these state transitions occurs.

The transition lines between states are annotated with corresponding raw symbol values, represented as the 3-bit value (i.e.: {a=Same_Phase, b=delta_Phase, c=delta_Polarity}), and the decimal equivalent of the raw symbol value that may be referred to as a transition number (TN). For the purposes of this description, the terms "raw symbol value" and "transition number" may be used interchangeably and typically are binary and decimal representations of the same quantity. The raw symbol value 1028 on the transition line 1032 between states +x and −y is annotated 1026 in FIG. 10. The most significant bit (a) of the raw symbol value may be set to binary 1 when the current symbol has the same phase as the prior symbol but and an opposite polarity from the prior symbol. The next most significant bit (b) of the raw symbol value may be used to indicate the phase rotation of the current symbol and, in the example, is set to binary 1 when the phase rotates clockwise and to binary 0 for counter clockwise phase rotation. The least significant bit (c) of the raw symbol value may be set to binary 1 when the polarity of the current symbol is different from the polarity of the prior symbol (i.e., a transition from +x to −x). In this example, the two least significant bits (b, c) of the raw symbol may be ignored when the most significant bit of the raw symbol is set to binary 1.

It can be observed that transitions from any state have symmetry with the transitions from all of the other states. For example, three transitions from any state result in one of the signal wires remaining at the same voltage. The signal wire having the unchanged voltage value may change from state to state, and the particular signal wire that remains in the same condition may change from state to state.

Figure 11:
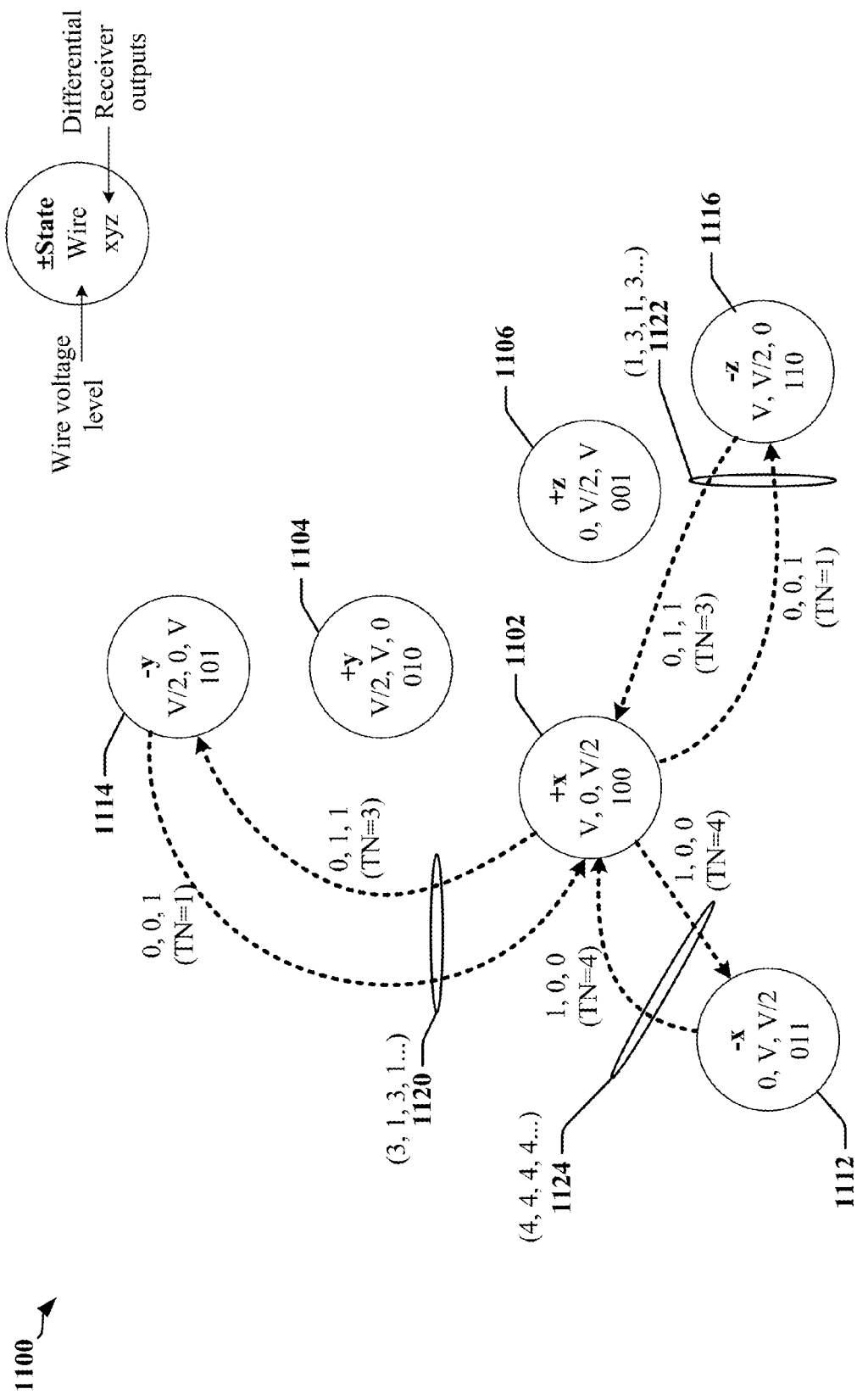
FIG. 11 is a state diagram illustrating the creation of run-length violations through loop-sequences of state transitions.

FIG. 11 is a state diagram 1100 that illustrates formation of a sequence of symbols in an encoding scheme that is susceptible to run-length violations. The sequences of symbols may include a simple loop-sequence of valid symbol transitions in which one or more signal wires remain in the same signaling state for the duration of the loop-sequence. In one example, a first loop 1120 results in a signal wire (B) remaining in the "0" signaling state. The first loop 1120 includes transitions from +x to −y, to +x, and back to −y. In another example, a second loop 1122 results in a signal wire (A) remaining in the "+V" signaling state. The second loop 1122 includes transitions from +x to −z, to +x and back to −z. In another example, a third loop 1124 results in a signal wire (C) remaining in the "+V/2" signaling state. The third loop 1124 includes transitions from +x to −x, to +x and back to −x. The first loop 1120 and the second loop 1222 are caused by occurrence of a " . . . 3, 1, 3, 1 . . . " sequence of transition numbers or a " . . . 1, 3, 1, 3 . . . " sequence of transition numbers. The third loop 1124 is caused by occurrence of a " . . . 4, 4, 4, 4 . . . " sequence of transition numbers. According to certain aspects disclosed herein, these three types of state loops, and others, may be detected by examining the sequence of transition numbers that caused the state loops, regardless of the starting state of the multi-wire interface.

Figure 12:
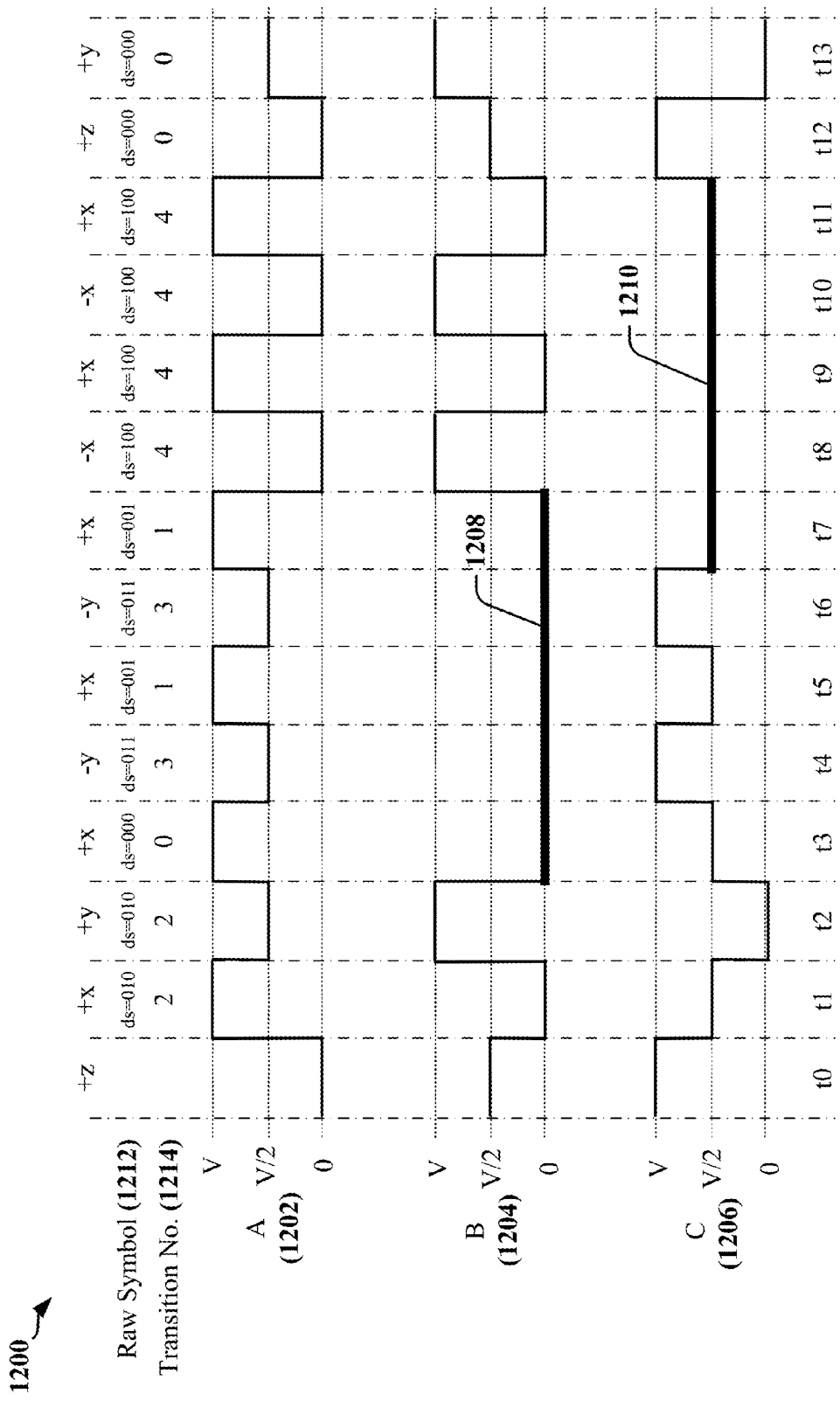
FIG. 12 a timing chart illustrating an example of state transitions in which two different state loops cause the run length to be equal to 5.

FIG. 12 is a timing chart 1200 illustrating an example of state transitions in which two different state loops cause a run length of 5 symbol intervals (the 5 consecutive states 1208) on one of the signals transmitted on a wire 1202, 1204, 1206 of the multi-wire N-phase interface. In the example, each symbol may be represented in relation to its preceding symbol by a transition number 1214. The transition number (TN) 1214 may be regarded as a decimal equivalent of the binary raw symbol value {a, b, c} 1212 detected by the receiver 920. For example, the raw symbol value {0, 1, 1} may be expressed as TN =3 number 3 and the raw symbol value {1, 0, 0} may be expressed as TN =4.

The timing chart 1200 includes two sequences of symbols that generate run-length violations. In one example, the "B" wire 1204 remains at 0 volts for 5 consecutive states 1208 (t3 through t7) because a group of the symbols 1212 corresponds to a series of transition numbers including " . . . 3, 1, 3, 1 . . . " Similarly, the "C" wire 1206 remains at V/2 volts for 5 consecutive states 1210 (t7 through t11) because a group of the symbols 1212 corresponds to a series of transition numbers including " . . . 4, 4, 4, 4 . . . ."

With continued reference to FIG. 9, and in accordance with certain aspects disclosed herein, a combination of the Mapper 904 and the Run-Length Limiter circuit or module (RLLM) 906 may be adapted or configured to determine when a run-length violation has occurred. The Mapper 904, and/or the RLLM 906 may be adapted or configured to apply an alternate mapping to ensure that the state of each of the 3 wires 912 (or M wires in an M-wire, N-phase encoder) switches between states more frequently. The RLLM 906 may be provided separately from, or within the Mapper 904. The RLLM 906 may include a run-length detection circuit or logic and/or the RLLM 906 may examine the raw symbols 930 output by the Mapper 904 to determine whether a run-length violation is likely to be generated in the signaling state of the wires 912 during the symbol intervals 934 corresponding to a serialized sequence of symbols generated from the raw symbols 930. The determination of a run-length violation may include a consideration of symbols in the previous or next sequence of symbols, which may combine with beginning or ending symbols in the current sequence of symbols 930 to produce a run-length violation that spans across either boundary of the 7 symbol intervals 934.

The RLLM 906 may be configured to apply an alternate mapping in order to prevent the occurrence of run-length violations. The alternative mapping may be implemented by substituting a surplus sequence of symbols for a sequence of symbols known to cause a run-length violation. The surplus sequence of symbols may include sequences of symbols that are available to the mapper but are unused because the data to be mapped encodes fewer values than the number of sequences of symbols available for transmission. A replacement sequence of symbols may be inserted in place of the originally mapped sequence of symbols 914 in order to constrain the run-length to a value of 5 or less.

Figure 13:
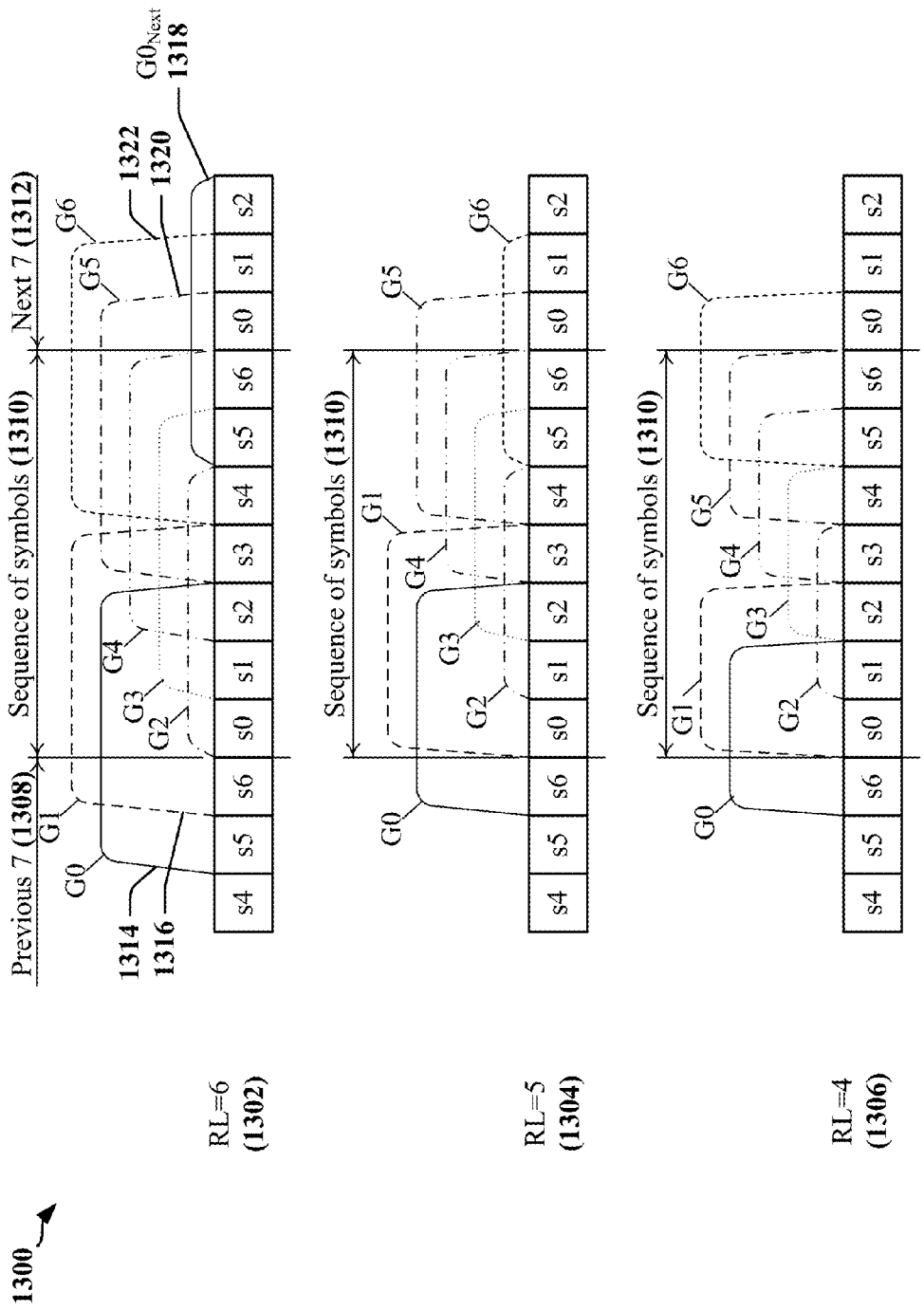
FIG. 13 is a timing diagram illustrating grouping of symbols used to determine if a run-length violation may occur in transmission of a sequence of symbols.

FIG. 13 is a diagram 1300 illustrating certain examples 1302, 1304, 1306 in which a sequence of symbols 1310 is considered together with a prior sequence of symbols 1308 and a subsequent sequence of symbols 1312 in order to detect a run-length violation. In one example 1302, a run-length limit of 6 is illustrated, and the run-length detection circuit in the RLLM 906 examines five consecutive symbols in order to detect a potential run-length of 6. Seven groups of symbols, labeled G0 through G6, are considered in order to detect a run-length of 6 for any current symbol 1310. In operation, a first group of symbols 1314 in a 5-symbol window is examined, followed by a second group of symbols 1316 identified by sliding the window right by one symbol. At some point, the window is positioned over a group of five symbols ($G0_{Next}$) 1318 that are examined for the next sequence of symbols 1312. At this point, a decision can be made on whether the current sequence of symbols 1310 is likely to cause a run-length violation, and whether substitution is to be made. As illustrated, the examination of each sequence of symbols 1310 or 1312 commences with the s5 and s6 symbols of the previous sequence of symbols 1308 or 1310, respectively. In some examples, the s5 and s6 symbols in the current sequence of symbols 1310 may be buffered and used in the $G0_{Next}$ group 1312 for determining run-length, and a look-ahead for the first two symbols s0 and s1 of the next 7 symbols 1312 may allow their inclusion in test groups G5 and G6.

In some receivers, it is assumed that a worst-case situation exists in the previous 7 symbols 1308 and/or the next 7 symbols 1312. Specifically, it may be assumed that a run-length observed in windows G0 1314 and G1 1316 would be an extension of a run-length that commenced in the last 2 symbols (s5 and s6) or last symbol (s6) of the previous seven symbols 1308, respectively. Similarly, it may be assumed that a run-length observed in symbols s3-s6 in the G5 window 1320 continues through the s0 symbol of the next seven symbols 1312 and that a run-length observed in symbols s4-s6 in the G6 window 1322 continues through the s0-s1 symbols of the next seven symbols 1312. Having assumed such extension of run-length between successive sequences of 7 symbols 1308, 1310 and 1312, the complexity of the run-length detection circuit may be reduced considerably. In effect, the G0 window 1314 and G6 window 1322 test three symbols and assume a run-length violation if these three symbols indicate a four symbol run-length, and further, the G1 window 1316 and G5 window 1320 test four symbols and a run-length violation is assumed if these four symbols indicate a five symbol run-length.

Using the latter optimizations, the groups G0-G6 in the first example 1302 can detect a run-length violation when the following sequences of raw symbol values are detected:

G0: xx131, xx313, xx444
G1: x1313, x3131, x4444
G2: 13131, 31313, 44444
G3: 13131, 31313, 44444
G4: 13131, 31313, 44444
G5: 1313x, 3131x, 4444x
G6: 131xx, 313xx, 444xx

Similar windowing and computational/circuit optimizations may be employed when the maximum run-length is set to 5 as shown in the second example 1304, and when the maximum run-length is set to 4 as in the third example 1306. In the second example 1304, the groups G0-G6 can detect a run-length violation when the following sequences of raw symbol values are detected:

G0: x131, x313, x444
G1: 1313, 3131, 4444
G2: 1313, 3131, 4444
G3: 1313, 3131, 4444
G4: 1313, 3131, 4444
G5: 131x, 313x, 444x
G6: 13xx, 31xx, 44xx

In the third example 1306, the groups G0-G6 can detect a run-length violation when the following sequences of raw symbol values are detected:

G0: x13, x31, x44
G1: 131, 313, 444
G2: 131, 313, 444
G3: 131, 313, 444
G4: 131, 313, 444
G5: 131, 313, 444
G6: 13x, 31x, 44x

These raw symbol sequence values may trigger a run-length violation if they appear at the output of the Mapper 904. Note that for G0 in the first example 1302, only the values of 131, 313, and 444 in symbols s0, s1 and s2 are considered when it is assumed that the symbols in the previous sequence of symbols 1308 contribute to a run-length violation. Specifically, it is assumed that symbols s5 and s6 of the previous seven symbols 1308 contain 13, 31 or 44, respectively.

According to certain aspects disclosed herein, a 3-Wire, 3-Phase polarity encoder may map 16 bits of input data 902 to seven symbols. The Mapper 904 maps the 65,536 possible values of the input data word 902 to a corresponding number of the 78,215 possible permutations of sequences of phase and polarity for the three wires. Accordingly 12,589 permutations of symbols may be considered to be surplus sequences of symbols because they are unused by conventional mappers.

According to certain aspects described herein, the 12,589 surplus sequences of symbols may provide a source of replacement symbol sequences that can be substituted for a sequence of 7 symbols 1308, 1310 and/or 1312 when a run-length violation is detected. The entire group of 7 symbols 1308, 1310 and/or 1312 may be replaced with one of the 12,589 unused symbol permutations. Not all of the 12,589 values are available to be used for replacement however, because some of these unused permutations can themselves contribute to run-length violations. There may be fewer unused symbol permutations available for replacement when shorter allowable run-lengths are desired or required.

In one example, unused symbol permutations may be found by examining the output of the Mapper 904 for all of the 65,536 ($2^{16}$) input values. Missing (i.e. unused) 7-symbol sequences can be easily detected by sorting the used 7-symbol sequences that appear at the output of the mapper. Unused 7-symbol sequences may be checked for run-length violations, and unused 7-symbol sequences without run-length violations may be allocated as replacement 7-symbol sequences that are available to substitute for values for the 7-symbol sequences output by the Mapper 904 that have run-length violations. When the desired or required maximum run-length is decreased, the number of 7-symbol sequences needing substitution at the output of the Mapper 904 typically increases while the number of available unused 7-symbol sequence decreases. For example, a larger number of the 12,589 unused permutations are likely to include run-length violations when the specified maximum run-length is decreased, thereby decreasing the number of available unused symbol sequences without run-length violations. At a certain point, the threshold maximum run-length may be so low that an insufficient of unused symbol sequences are available to be substituted for the increased number of used symbol sequences that violate the maximum run-length.

Figure 14:
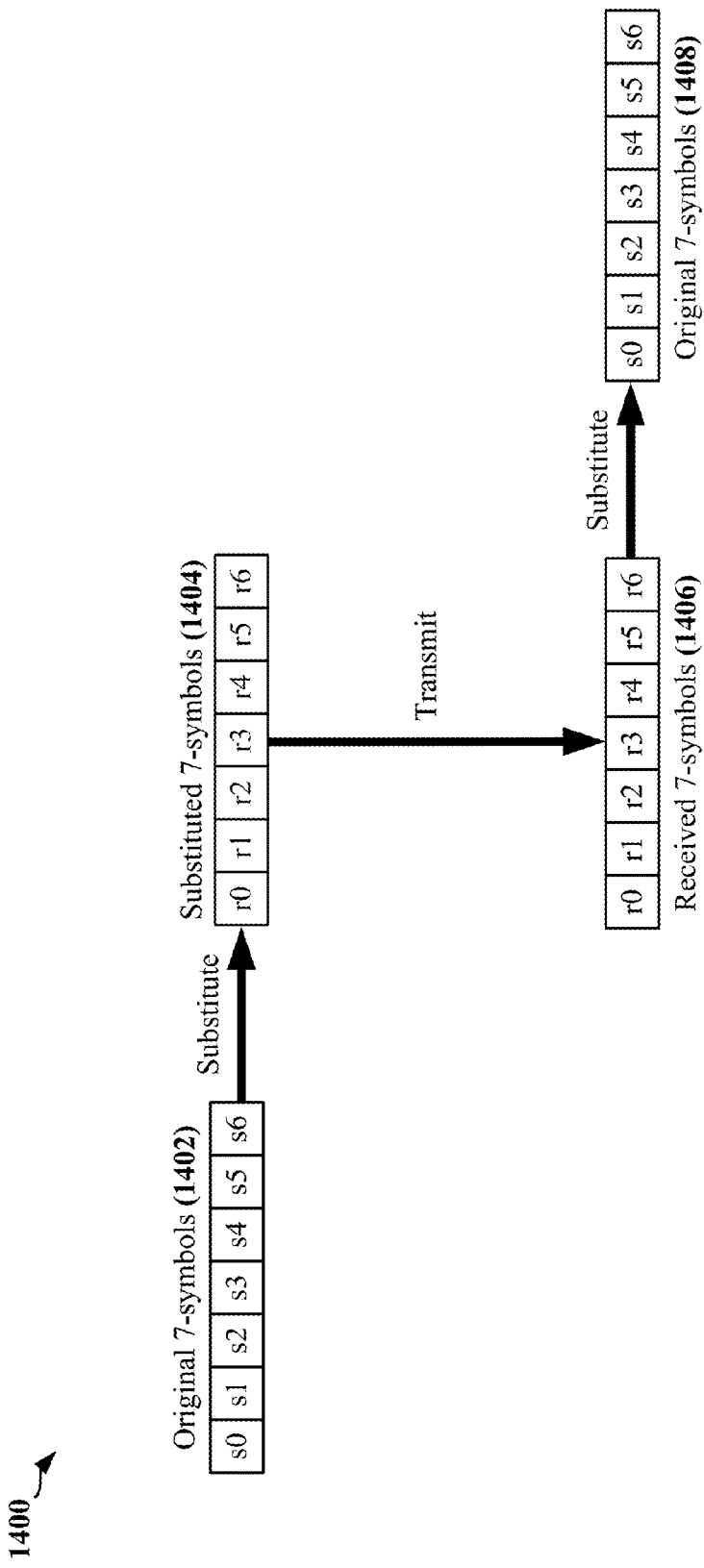
FIG. 14 is a data flow diagram illustrating the operation of run-length circuits and modules according to certain aspects disclosed herein.

FIG. 14 is a simplified data flow diagram 1400 illustrating a substitution process according to certain aspects disclosed herein. In the illustrated example, 7-symbol sequence substitution involves replacing one 7-symbol sequence 1402 associated with potential or actual run-length violations with another 7-symbol sequence 1404 that does not contribute to, or include run-length violations. Typically, a one-to-one replacement mapping is employed, such that there is a unique replaced 7-symbol sequence 1404 for every 7-symbol sequence 1402 in need of replacement. Selection of 7-symbol sequences 1404 to be used for substitution may be effected using a look-up table that maps problematic 7-symbol sequences 1402 to unused 7-symbol sequences 1404 that have been cleared of run-length violations.

At the receiving side, an inverse replacement process is performed by a symbol replacement module or circuit 926. A received 7-symbol sequence 1406 may be identified as including a substitute sequence of symbols and the received 7-symbol sequence 1406 may be then replaced by a 7-symbol sequence 1408 that is associated in a table, or by algorithm, with the substitute 7-symbol sequence 1406. When the 7-symbol sequence replacement mapping is one-to-one, there is typically no ambiguity in the replacement of the original 7-symbol sequence at the receiver 920. The transmitter 900 and receiver 920 may agree on a table to be used to facilitate substitution at the transmitter 900 and replacement at the receiver 920.

It is contemplated that other methods for selecting a substitution 7-symbol sequence at the transmitter 900 and its replacement at the receiver 920 may be used. For example, an algorithmic selection system may be used. Moreover, the run-length violation avoidance techniques described herein may be equally applied to various M-Wire N-Phase Polarity encoding schemes. As shown in FIG. 7, a non-integer number of bits can be encoded in each symbol for a variety of encoding schemes. As noted in relation to FIG. 8, for example, one 6-wire N-Phase Polarity encoding scheme yields $\log_2(89) \cong 6.47$ bits per symbol. In this example, a 32-bit word can be encoded by the mapper into 5 symbols, given that 5×6.47=32.35 bits. Thus, only 4,294,967,296 values are used from the available 5,474,196,211 values, leaving a significant number of symbols available for substitution

TABLE 2

| 7 Sym 16 bit dp RL3 | 7 Sym 16 bit dp RL4 | 7 Sym 16 bit dp RL5 | |
|---|---|---|---|
| 3 | 4 | 5 | Max. run length |
| 78125 | 78125 | 78125 | Total states available |
| 65536 | 65536 | 65536 | Basic Mapping States |
| 12589 | 12589 | 12589 | Total Unused states |
| <14392 | 8366 | 11726 | Good Unused States |
| 14392 | 7306 | 2412 | Problematic States |
| −ve | 1060 | 9314 | If +ve, substitution possible |
| Insufficient | Sufficient | Sufficient | |

Table 2 illustrates the number of sequences of symbols that are available to be used for symbol substitution in different encoding schemes, and for a given maximum desired or permissible ("dp") run-length. Each string of substitution symbols may be selected to ensure that the order of the symbols in the string of substitution symbols does not create a sequence of transition numbers (see FIG. 12) that may generate a run-length violation. In some instances, the string of substitution symbols may be selected to ensure that the order of the symbols in the string of substitution symbols does not create a sequence of transition numbers for all possible values of one or more symbols that can precede or follow the string of substitution symbols.

In some instances, the decision to substitute symbols and the selection of a string of substitution symbols to be used for substitution may be made using circuits or modules that are algorithmically controlled. In some instances, one or more tables may be used to determine when symbols should be substituted and to select the string of substitution symbols to be used for substitution. In one example, patterns may be detected in the symbols and/or transition numbers generated by a symbol mapper using a reference table of problematic symbol sequences.

FIG. 15 is a diagram 1500 illustrating a symbol substitution scheme employed by a transmitter 900 (see FIG. 9). Each row of the left-side table 1502 is populated by values representing a set of seven 3-bit symbols received from a mapper 904 in a transmitter 900. The values include decimal transition numbers that relate to symbols that may cause run-length violations or to replacement symbols, and the values include representations of transition numbers (s0, s1, . . . s6) that relate to symbols that do not contribute to a run-length violation. Each row of the right-side table 1504 is populated by values representing a set of seven 3-bit symbols provided by a run-length eliminator 906 for transmitting on a 3-phase communications link. The run-length eliminator 906 evaluates each set of 7 symbols to determine if problematic sequences of symbols are present in the sequence. In the depicted example, the eleventh row 1506 includes no problematic sequences of symbols and the symbols are transmitted without substitution. Each of the remaining rows (1-10) includes problematic sequences of symbols.

For example, the first row 1508 includes a sequence of transition numbers (i.e., " . . . 1, 3, 1, 3, 1 . . . ") that may cause an undesirable run-length condition. The run-length eliminator 906 may substitute the symbols that cause the run length with a string of substitute symbols that are selected from surplus symbols, as discussed herein. The string of substitute symbols may be appended to the remaining symbols of the symbols received from the mapper 904 after the problematic symbols have been removed. In the example of the first row 1508, the string of substitute symbols may be configured to generate a sequence of transition numbers ( . . . 0, 4, 4, 3, 4 . . . ).

With regard to the second row 1510, a different sequence of symbols (i.e. " . . . 3, 1, 3, 1, 3 . . .") may cause an undesirable run-length condition similar to the run-length condition created in the example of the first row 1508. The run-length eliminator 906 may substitute the symbols that cause the run length with a string of substitute symbols that are selected from the "unused" symbols, as discussed herein. The string of substitute symbols may be appended to the remaining symbols of the symbols received from the mapper 904. In the example of the second row 1510, the string of substitute symbols may be configured to generate a sequence of transition numbers ( . . . 1, 4, 4, 3, 4 . . .). The differences in the strings of substitute symbols, which include the leading transition number in this example, enable the receiver 920 to reconstruct the symbols generated by the mapper 904.

In the example depicted, the right-side table 1504 includes a column 1516 that identifies a priority that applies to each row spanning the left-side table 1502 and the right-side table

1504. The priorities in this column 1516 can be used to control the order in which a search for the sequences of values identified in the left-side table 1502 is performed. According to one aspect, a search may attempt to eliminate the potential for replacement errors by checking for priority-1 sequences first, followed by priority-2 sequences, then priority-3 sequences, and so on. In one example, sequences corresponding to those in the priority-1 first row 1508 should be detected before searching for the sequences found in the priority-2 sixth row 1514, because the "s3" value in the sixth row 1514 could be equal to 1, and it is possible that a sequence of transition numbers generated by a transmitter could match sequences in both the first row 1508 and the sixth row 1514. In another example, the priority-1 second row 1510 should be detected before searching for the sequences found in the priority-2 third row 1512, because the "s3" value in the third row 1512 could be equal to 3, and it is possible that a sequence of transition numbers generated by a transmitter could match sequences in both the second row 1510 and the third row 1512.

According to certain aspects described herein, each sequence of symbols that may result in a run-length issue may be replaced by a string of substitute symbols that identifies the problematic sequence and its configuration and location within a set of 7 symbols.

FIG. 16 is a table 1600 illustrating a symbol restoration scheme employed by a receiver 920, which reverses the substitution performed at the transmitter 900. Each row of the left-side table 1602 is populated by values representing a set of seven 3-bit symbols received from a 3-phase receiver/decoder 922 and a serial-to-parallel converter 924 in a receiver 920 (see FIG. 9). The values may be raw symbol values. Each row of the right-side table 1604 represents a set of seven 3-bit symbols provided by the run-length eliminator logic 926 to the demapper 928, which produces output data 950. The run-length eliminator logic 926 evaluates each set of 7 symbols to determine if the transmitter 900 has substituted one or more symbols. As noted in relation to FIG. 15, the eleventh row 1606 in the depicted example includes no substituted symbols and the symbols of the eleventh row 1606 are passed through the run-length eliminator logic 926 without change. Each of the remaining rows (1-10) includes replacement symbols.

For example, the first row 1608 includes a sequence of transition numbers (i.e., "... 0, 4, 4, 3, 4 ...") of which the "4, 4, 3, 4" indicates that a specific type of replacement has occurred, and the "0" indicates that the original symbols would have caused the 3-phase receiver/decoder 922 to generate the ("... 1, 3, 1, 3, 1. .."). This latter sequence is substituted for the received raw symbols. As shown by the example of the second row 1610, the "4, 4, 3, 4" sequence of transition numbers from the decoded raw symbols (i.e., "... 1, 4, 4, 3, 4...") indicates that a replacement has occurred, and the "1" indicates that the original symbols would have caused the 3-phase receiver/decoder 922 to generate the ("... 3, 1, 3, 1, 3..."). This latter sequence is substituted for the received raw symbols the second row 1610.

In the example depicted, the right-side table 1604 includes a column 1612 that identifies a priority that applies to each row spanning the left-side table 1602 and the right-side table 1604. The priorities in this column 1612 can be used to control the order in which a search for the sequences of values identified in the left-side table 1602 is performed. Prioritization may be performed in some instances for the same or similar reasons discussed in relation to FIG. 15. According to one aspect, a search may attempt to eliminate the potential for replacement errors by checking for priority-1 sequences first, followed by priority-2 sequences, then priority-3 sequences, and so on.

Figure 17:
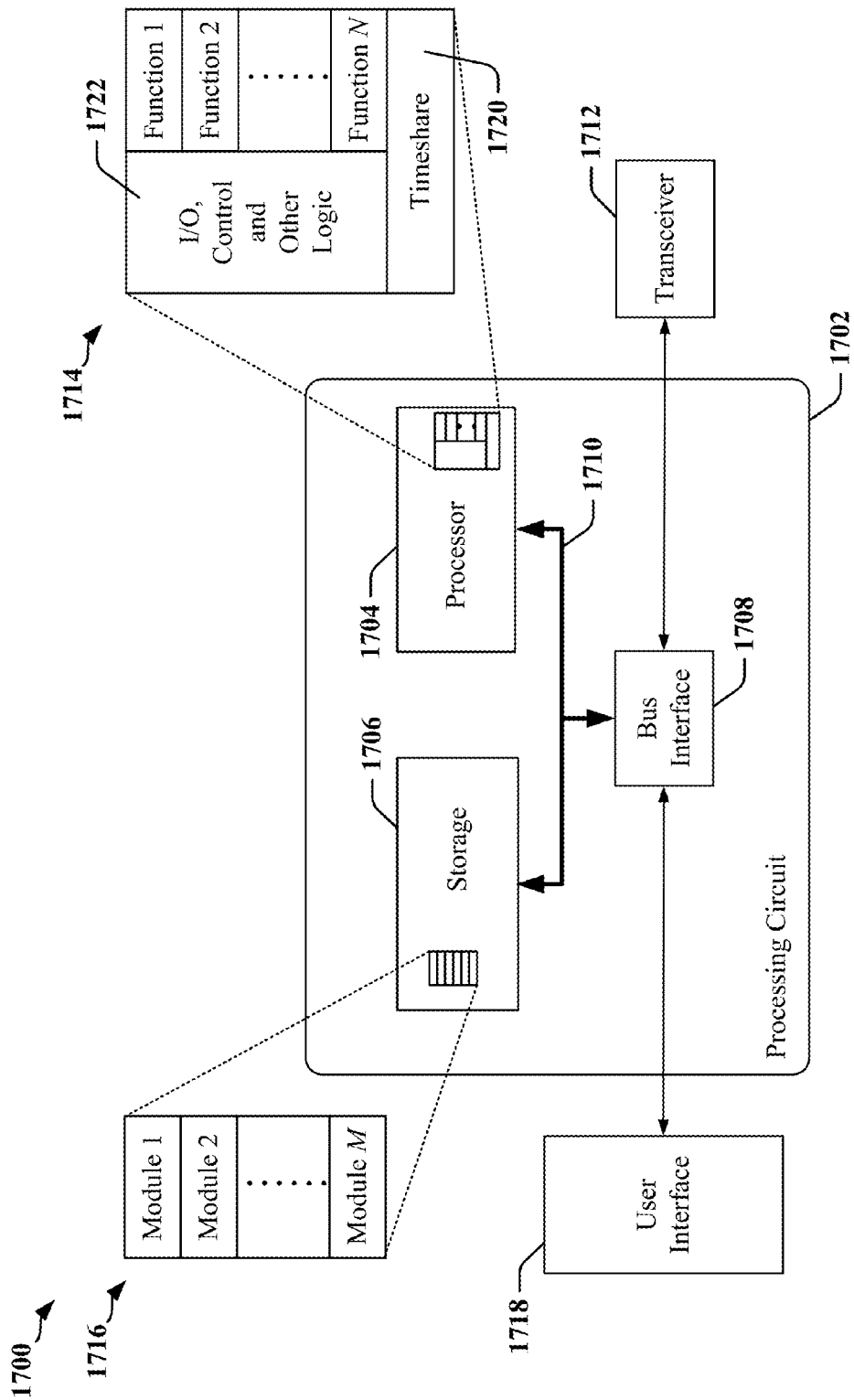
FIG. 17 is a block diagram illustrating an example of an apparatus employing a processing system that may be adapted according to certain aspects disclosed herein.

FIG. 17 is a conceptual diagram 1700 illustrating a simplified example of a hardware implementation for an apparatus employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include one or more processors 1704 that are controlled by some combination of hardware and software modules. Examples of processors 1704 include microprocessors, microcontrollers, digital signal processors (DSPs), field programmable gate arrays (FPGAs), programmable logic devices (PLDs), state machines, sequencers, gated logic, discrete hardware circuits, and/or other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. The storage 1706 may include memory devices and mass storage devices, and may be referred to herein as computer-readable media. The bus 1710 may also link various other circuits such as timing sources, timers, peripherals, voltage regulators, and power management circuits. A bus interface 1708 may provide an interface between the bus 1710 and a transceiver 1712. The transceiver 1712 provides a means for communicating with various other apparatus over a transmission medium. Depending upon the nature of the apparatus, a user interface 1718 (e.g., keypad, display, speaker, microphone, joystick) may also be provided, and may be communicatively coupled to the bus 1710 directly or through a bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer readable medium. The computer-readable medium and/or storage 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. The computer-readable medium and/or the storage 1706 may reside in the processing circuit 1702, in the processor 1704, external to the processing circuit 1702, or may be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, serial-to-parallel converters, parallel-to-serial converters, mappers, demappers, encoders, decoders, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
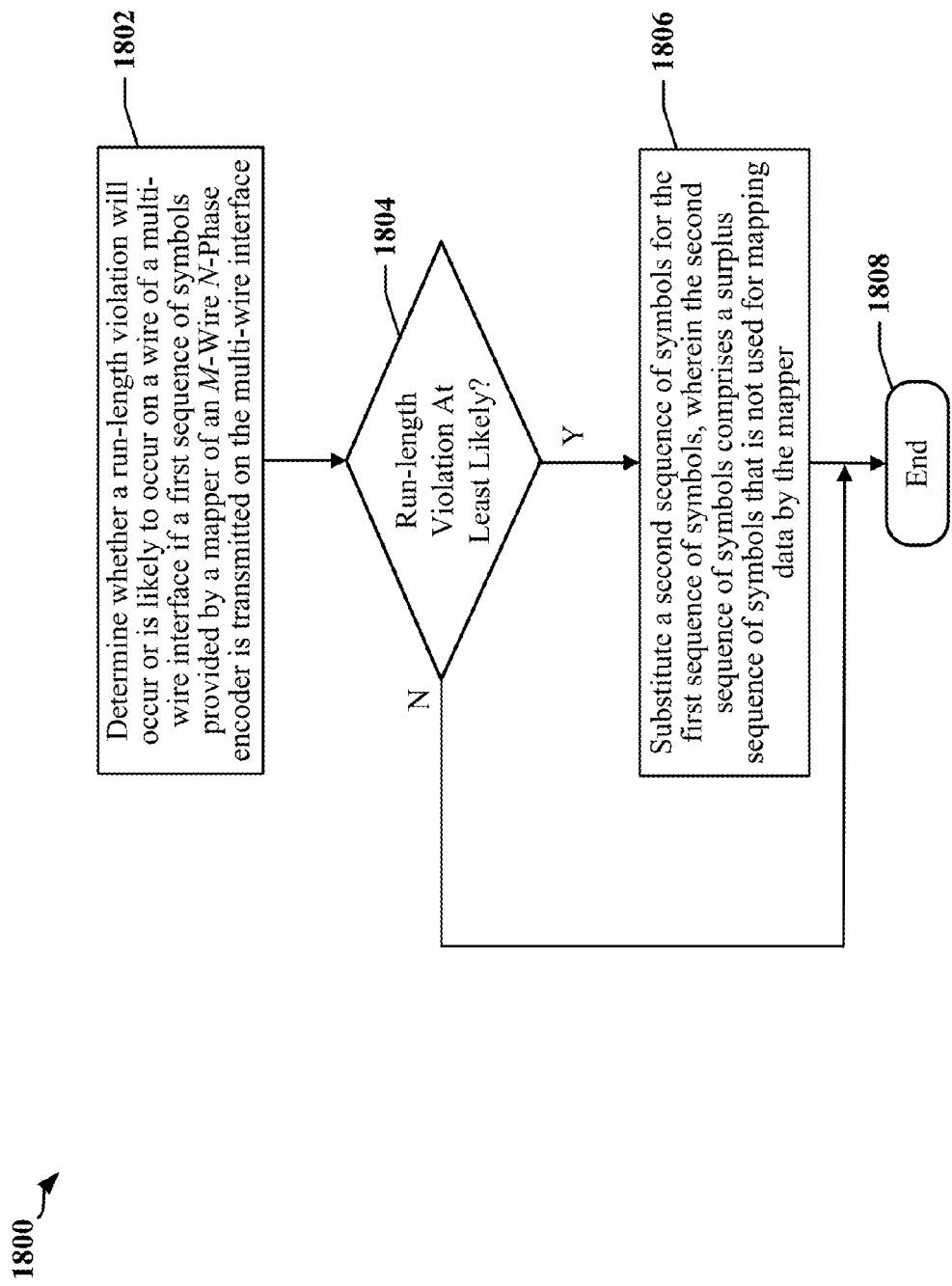
FIG. 18 is a flow chart of a method for selective N-phase polarity encoding.

FIG. 18 is a flowchart illustrating a data transfer method according to certain aspects of the invention. At step 1802, it is determined whether a run-length violation will occur or is likely to occur on a wire of a multi-wire interface if a first sequence of symbols provided by a mapper of an M-Wire N-Phase encoder is transmitted on the multi-wire interface.

If at step 1804, it is determined that a run-length violation is unlikely to occur, then the method terminates at step 1808.

If at step 1804, it is determined that a run-length violation will occur or is likely to occur, then the method proceeds to step 1806 where a second sequence of symbols is substituted for the first sequence of symbols. The second sequence of symbols includes surplus sequences of symbols that are not otherwise used for mapping data in the mapper.

In an aspect of the disclosure, an encoding scheme used by the encoder defines a set of available sequences of symbols. The mapper may be configured to use a subset of the set of available sequences of symbols to map the data. The surplus sequences of symbols may not be in the subset of the set of available sequences of symbols. The second sequence of symbols may be substituted for the first sequence of symbols using a table to select the second sequence of symbols based on the content of the first sequence of symbols. The second sequence of symbols may be substituted for the first sequence of symbols by generating a plurality of replacement sequences from the surplus sequences of symbols, and selecting as the second sequence of symbols, one of the plurality of replacement sequences which is calculated to be unlikely to cause the run-length violation.

In an aspect of the disclosure, the run-length violation occurs if one or more of the plurality of wires fails to change state while a predefined number of symbols are sequentially transmitted on the plurality of wires.

In an aspect of the disclosure, it may be determined that the run-length violation would occur by identifying a combination of symbols known to cause the run-length violation. The combination of symbols may include a predefined number of symbols. It may be determined that the run-length violation would occur by identifying a portion of the combination of symbols known to cause the run-length violation at the beginning of the first sequence of symbols. It may be determined that the run-length violation would occur by identifying a portion of the combination of symbols known to cause the run-length violation at the end of the first sequence of symbols.

In an aspect of the disclosure, the second sequence of symbols may be transmitted on the plurality of wires in place of the first sequence of symbols. Each of the first sequence of symbols and the second sequence of symbols may include seven symbols. In one example, 16 bits of data may be mapped to a first sequence of symbols having 7 symbols therein.

In an aspect of the disclosure, the symbols of the second sequence of symbols may be transmitted on the plurality of wires by transmitting a first symbol which drives a first wire and a second wire to voltage states that are different from one another. A third wire may be in a state that is different from the voltage states of the first wire and the second wire.

The method is terminated at step 1808.

Figure 19:
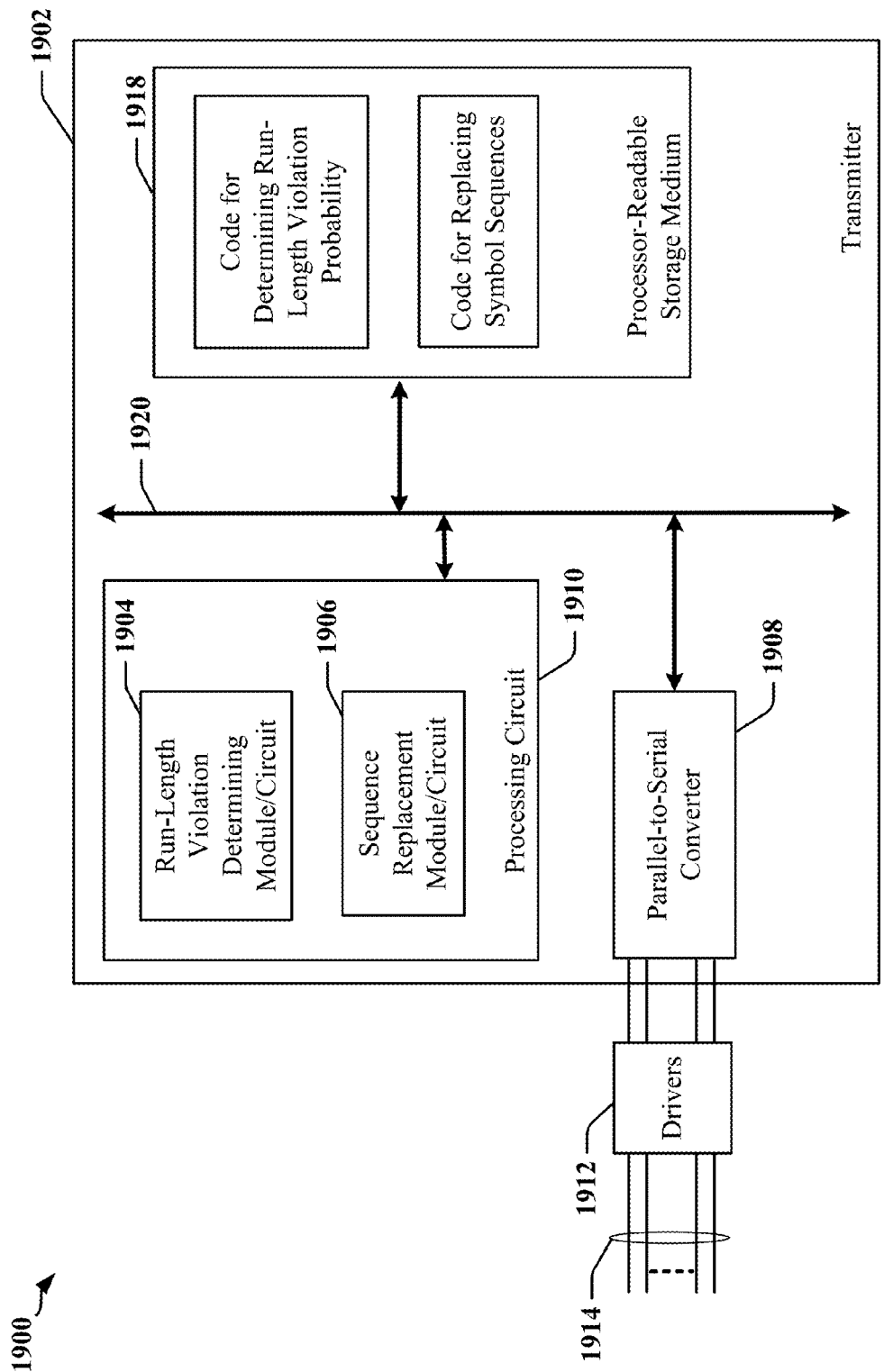
FIG. 19 is a diagram illustrating an example of a hardware implementation for an encoding apparatus in a transmitter employing N-phase polarity data encoding.

FIG. 19 is a diagram 1900 illustrating an example of a hardware implementation for a transmitting apparatus 1902 employing a processing circuit 1910. The processing circuit 1910 may be coupled to a bus architecture, represented generally by the bus 1920. The bus 1920 may include any number of interconnecting buses and bridges depending on the specific application of the encoding apparatus 1902 and certain overall design constraints. The bus 1920 links together various circuits including one or more processors and/or hardware modules, represented by the processing circuit 1910, the modules and/or circuits 1904, 1906, the parallel-to-serial converter 1908, and the computer-readable medium 1918. The bus 1920 may also link various other circuits such as timing sources, peripherals, voltage regulators, and power management circuits, which are well known in the art.

The processing circuit 1910 may be coupled to line driver circuits 1912, through a parallel-to-serial converter 1908 and/or other circuits and modules. The line driver circuits 1912 may be selectively coupled to a plurality of connectors and/or wires 1914 under control of the processing circuit 1910. The line driver circuits 1912 provide a means for communicating with various other apparatus over a transmission medium including the wires 1914. The processing circuit 1910 may be coupled to a computer-readable medium 1918. The processing circuit 1910 is responsible for general processing, including the execution of software stored on the computer-readable medium 1918. The software, when executed by the processing circuit 1910, causes the processing circuit 1910 to perform the various functions described supra for any particular apparatus. The computer-readable medium 1918 may also be used for storing data that is manipulated by the processing circuit 1910 when executing software. The processing system further includes at least one of the circuits and/or modules 1904, 1906 and 1908. The modules may be software modules running in the processing circuit 1910, resident/stored in the computer readable medium 1918, one or more hardware modules coupled to the processing circuit 1910, or some combination thereof.

In one configuration, the encoding apparatus 1902 includes means, modules or circuits 1904, for determining that a run-length violation will occur or is likely to occur if a first sequence of symbols provided by a mapper of an M-Wire N-Phase encoder is transmitted on a plurality of wires, and means, modules or circuits 1906 for substituting a second sequence of symbols for the first sequence of symbols. The encoding apparatus 1902 may include means for transmitting the sequence of symbols on the first set of connectors, including a plurality of line drivers which may be switched between one or more wires/connectors and/or activated or deactivated to obtain a trade off between bandwidth and power consumption. The aforementioned means, modules and circuits may be one or more of the aforementioned modules of the encoding apparatus 1902 and/or the processing circuit 1910 configured to perform the functions recited by the aforementioned means.

Figure 20:
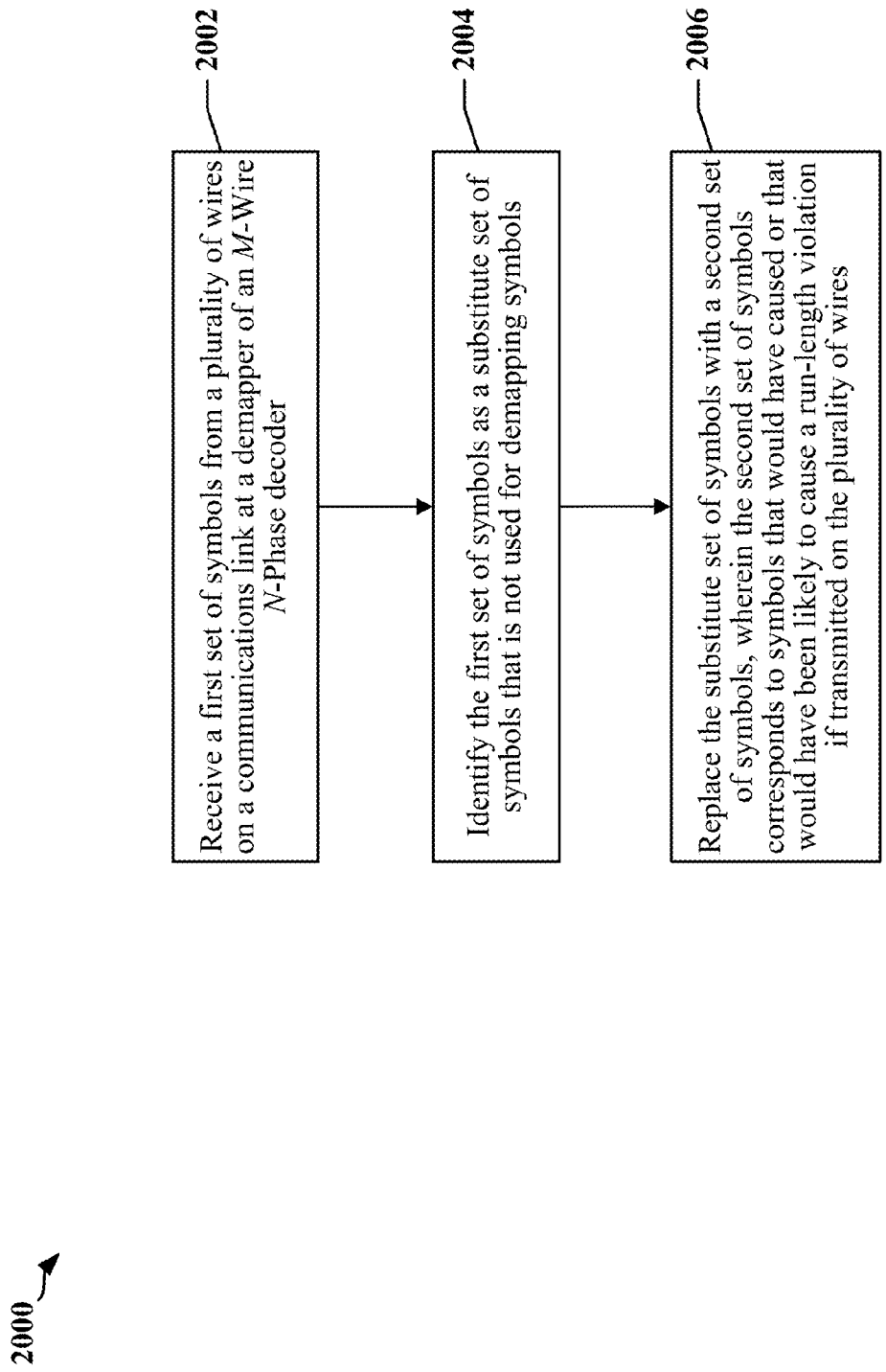
FIG. 20 is a flow chart of a method for selective N-phase polarity decoding.

FIG. 20 is a flowchart 2000 of a data transfer method that is performed by a decoder and/or demapper of a receiver 920. At step 2002, a first set of symbols is received from a plurality of wires on a communications link at a demapper of an M-Wire, N-Phase decoder.

At step 2004, the first set of symbols may be identified as a substitute set of symbols that is not used for demapping symbols.

At step 2006, a second set of symbols is substituted for the first set of symbols. The second set of symbols may correspond to symbols that would have caused or that would likely have caused a run-length violation if transmitted on the plurality of wires. The run-length violation may occur when one or more of the plurality of wires fail to change state while a predefined number of symbols are sequentially transmitted on the plurality of wires. The run-length violation may be likely to occur if the second set of symbols includes a portion of a combination of symbols known to cause the run-length violation at the beginning of the first set of symbols. The run-length violation may be likely to occur if the second set of symbols includes a portion of a combination of symbols known to cause the run-length violation at the end of the first set of symbols. Each of the first set of symbols and the second set of symbols may include seven symbols.

In an aspect of the disclosure, the demapper may be configured to demap 16 bits of data from the second set of symbols.

Figure 21:
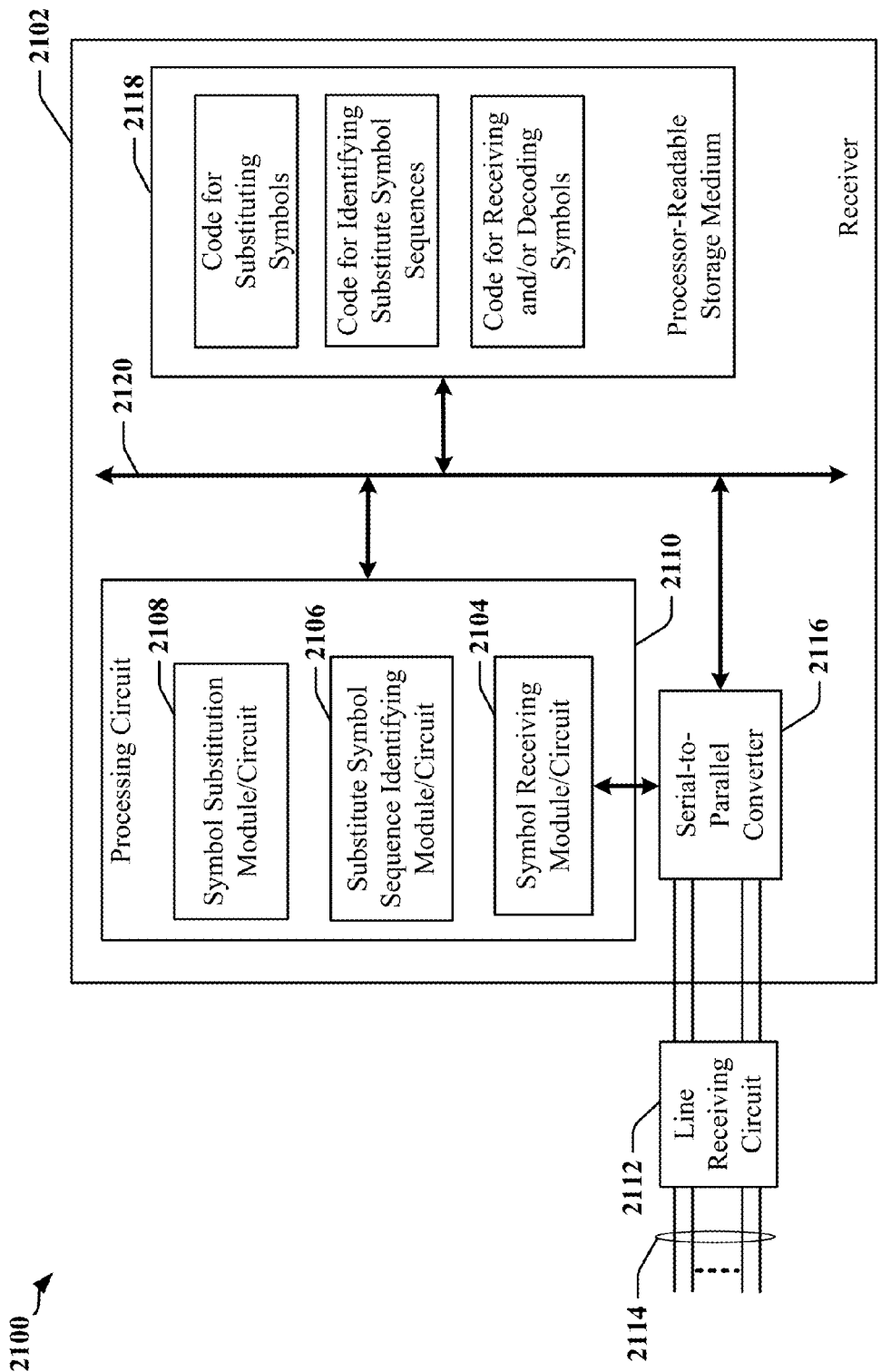
FIG. 21 is a diagram illustrating an example of a hardware implementation for a decoding apparatus in a receiver of an N-phase polarity encoded signal.

FIG. 21 is a diagram 2100 illustrating an example of a hardware implementation of a receiver circuit 2102. The receiver circuit 2102 may include a processing circuit 2110 that may be coupled to a bus architecture, represented generally by the bus 2120. The bus 2120 may include any number of interconnecting buses and bridges depending on the specific application of the receiver circuit 2102 and certain overall design constraints. The bus 2120 links together various circuits including one or more processors and/or hardware modules, represented by the processing circuit 2110, the modules 2104, 2106, 2108, a serial-to-parallel converter 2116 and the computer-readable medium 2118. The bus 2120 may also link various other circuits such as timing sources, peripherals, voltage regulators, and power management circuits.

The processing circuit 2110 is responsible for general processing, including the execution of software stored on the computer-readable medium 2118. The software, when executed by the processing circuit 2110, causes the processing circuit 2110 to perform the various functions described supra for any particular apparatus. The computer-readable medium 2118 may also be used for storing data that is manipulated by the processing circuit 2110 when executing software. The receiver circuit 2102 further includes at least one of the modules 2104, 2106, and/or 2108. The modules 2104, 2106, and/or 2108 may be software modules running in the processing circuit 2110, resident/stored in the computer readable medium 2118, one or more hardware modules coupled to the processing circuit 2110, or some combination thereof.

In one configuration, the receiver circuit 2102 includes symbol receiving modules or circuits 2104 that are configured to receive a first set of symbols from a plurality of wires on a communications link 2114, identifier modules or circuits 2106 configured to identify first set of symbols as a substitute set of symbols that is not used for demapping symbols, and substituting modules or circuits 2108 that are configured to substitute a second set of symbols for the first set of symbols. The second set of symbols may correspond to symbols that would have caused or that would likely have caused a run-length violation if transmitted on the plurality of wires. The receiver circuit 2102 and/or the processing circuit 2110 may be configured to perform the functions ascribed to the aforementioned modules and circuits.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data transfer method comprising:
at a transmitting device coupled to a three-wire interface, mapping data to a first sequence of symbols representing phase transitions and polarity transitions of a three-phase signal that is transmitted on each wire of the three-wire interface, wherein the three-phase signal transmitted on each wire of the three-wire interface is 120 degrees out-of-phase with the three-phase signals transmitted on the other two wires of the three-wire interface;
at the transmitting device, determining that the first sequence of symbols is associated with a run-length violation on at least one wire of the three-wire interface;
at the transmitting device, substituting a second sequence of symbols for the first sequence of symbols, wherein the second sequence of symbols comprises a surplus sequence of symbols that is not one of a plurality of valid sequences of symbols used by the transmitting device for mapping data; and
at the transmitting device, controlling phase and polarity of the three-phase signal that is transmitted on each wire of the three-wire interface in accordance with the second sequence of symbols,
wherein a run-length violation occurs when the at least one wire remains in a same signaling state during transmission of a predefined number of successive symbols, wherein during transmission each symbol defines a signaling state of each wire in the three-wire interface.

2. The method of claim 1, wherein an encoding scheme used by the transmitting device defines a set of available sequences of symbols, wherein the transmitting device is configured to use a subset of the set of available sequences of symbols to map the data, and wherein the surplus sequence of symbols is not in the subset of the set of available sequences of symbols.

3. The method of claim 2, wherein substituting the second sequence of symbols for the first sequence of symbols includes:
using a table to select the second sequence of symbols based on content of the first sequence of symbols, wherein the run-length violation occurs if one or more wires of the three-wire interface fails to change state while a predefined number of symbols are sequentially transmitted over the three-wire interface.

4. The method of claim 2, wherein substituting the second sequence of symbols for the first sequence of symbols includes:
generating a plurality of replacement sequences that are not in the subset of the set of available sequences of symbols; and
selecting as the second sequence of symbols, one of the plurality of replacement sequences which will not cause the run-length violation or which is unlikely to cause the run-length violation.

5. The method of claim 1, wherein determining that the run-length violation will occur includes:
identifying a combination of symbols known to cause the run-length violation wherein the combination of symbols includes a predefined number of symbols.

6. The method of claim 5, wherein determining that the run-length violation is likely to occur includes:
identifying a portion of the combination of symbols known to cause the run-length violation at a beginning of the first sequence of symbols or at an end of the first sequence of symbols.

7. The method of claim 1, wherein mapping data to the first sequence of symbols comprises:
providing a 16-bit data word to a mapper configured to map the 16-bit data word to a sequence of 7 symbols.

8. The method of claim 7, further comprising:
transmitting the symbols of the second sequence of symbols on the three-wire interface,
wherein each symbol is transmitted by driving a first wire and a second wire to voltage states that are different from one another, wherein a third wire is in a state that is different from the voltage states of the first wire and the second wire.

9. A driver circuit comprising:
a plurality of line drivers coupled to a three-wire interface and configured to transmit a three-phase signal on each wire of the three-wire interface, wherein the three-phase signal transmitted on each wire of the three-wire interface is 120 degrees out-of-phase with the three-phase signals transmitted on the other two wires of the three-wire interface;
an encoder configured to generate a first sequence of symbols from input data by encoding the input data in phase transitions and polarity transitions of the three-phase signal, wherein each symbol defines a signaling state of the three-wire interface, the signaling state identifying a polarity of a first wire and a second wire of the three-wire interface, and a third wire of the three-wire interface that is undriven; and
a symbol sequence replacer configured to:
determine that the first sequence of symbols is associated with a run-length violation on at least one wire of the three-wire interface; and
substitute a second sequence of symbols for the first sequence of symbols, wherein the second sequence of symbols comprises a surplus sequence of symbols that is not one of a plurality of valid sequences of symbols used for mapping data by a mapper, wherein the plurality of line drivers is configured to control phase and polarity of the three-phase signal that is transmitted on each wire of the three-wire interface in accordance with the second sequence of symbols, and wherein a run-length violation occurs when the at least one wire remains in a same signaling state during transmission of a predefined number of successive symbols.

10. The driver circuit of claim 9, wherein an encoding scheme used by the encoder defines a set of available sequences of symbols, wherein the mapper is configured to use a subset of the set of available sequences of symbols to map the data, and wherein the surplus sequence of symbols is not in the subset of the set of available sequences of symbols.

11. The driver circuit of claim 10, wherein substituting the second sequence of symbols for the first sequence of symbols includes:

using a table to select the second sequence of symbols based on content of the first sequence of symbols, wherein the run-length violation occurs if one or more wires of the three-wire interface fails to change state while a predefined number of symbols are sequentially transmitted on the three-wire interface.

12. The driver circuit of claim 10, wherein substituting the second sequence of symbols for the first sequence of symbols includes:

generating a plurality of replacement sequences that are not in the subset of the set of available sequences of symbols; and selecting as the second sequence of symbols, one of the plurality of replacement sequences which will not cause the run-length violation or which is unlikely to cause the run-length violation.

13. The driver circuit of claim 9, wherein determining that the run-length violation will occur includes:

identifying a combination of symbols known to cause the run-length violation wherein the combination of symbols includes a predefined number of symbols.

14. The driver circuit of claim 13, wherein determining that the run-length violation is likely to occur includes:

identifying a portion of the combination of symbols known to cause the run-length violation at a beginning of the first sequence of symbols or at an end of the first sequence of symbols.

15. The driver circuit of claim 9, wherein each of the first sequence of symbols and the second sequence of symbols includes seven symbols, and wherein a 16-bit data word is mapped to the first sequence of symbols.

16. The driver circuit of claim 15, further comprising a transmitter configured to:

transmit the symbols of the second sequence of symbols on the three-wire interface, wherein each symbol is transmitted by driving a first wire and a second wire to voltage states that are different from one another, wherein a third wire is in a state that is different from the voltage states of the first wire and the second wire.

17. A data transfer method comprising:

at a receiving device, receiving a first set of symbols from a decoder coupled to a three-wire interface, wherein each symbol in the first set of symbols represents a signaling state of the three-wire interface, wherein data is encoded in phase transitions and polarity transitions of a three-phase signal received from each wire of the three-wire interface, where the three-phase signal received from each wire of the three-wire interface is 120 degrees out-of-phase with the three-phase signals received from the other two wires of the three-wire interface;

identifying the first set of symbols as a substitute set of symbols;

replacing the substitute set of symbols with a second set of symbols, wherein the second set of symbols is associated with a run-length violation on at least one wire of the three-wire interface; and using a demapper to convert the second set of symbols to output data, wherein a run-length violation occurs when the at least one wire remains in a same signaling state during transmission of a predefined number of successive symbols.

18. The method of claim 17, wherein a set of valid sequences of symbols is defined at the receiving device, wherein the demapper is configured to use a subset of the set of valid sequences of symbols, and wherein the first set of symbols is not included in the set of valid sequences of symbols.

19. The method of claim 17, wherein the run-length violation occurs when one or more wires of the three-wire interface fail to change state while a predefined number of symbols are sequentially transmitted on the three-wire interface.

20. The method of claim 17, wherein the run-length violation is likely to occur if the second set of symbols includes a portion of a combination of symbols known to cause the run-length violation at a beginning of the first set of symbols.

21. The method of claim 17, wherein the run-length violation is likely to occur if the second set of symbols includes a portion of a combination of symbols known to cause the run-length violation at an end of the first set of symbols.

22. The method of claim 17, wherein each of the first set of symbols and the second set of symbols includes seven symbols.

23. The method of claim 22, wherein the demapper is configured to demap 16 bits of data from the second set of symbols.

24. An apparatus comprising:

a plurality of differential receivers each coupled to a different pair of wires in a three-wire interface, wherein a three-phase signal is received from each wire of the three-wire interface, and wherein the three-phase signal received from each wire of the three-wire interface is 120 degrees out-of-phase with the three-phase signals received from the other two wires of the three-wire interface;

a decoder configured to provide a first set of symbols by decoding outputs of the plurality of differential receivers, wherein each symbol in the first set of symbols represents a signaling state of the three-wire interface, wherein data is encoded in phase transitions and polarity transitions of the three-phase signal;

a circuit configured to replace the first set of symbols with a second set of symbols when the first set of symbols is identified as a substitute set of symbols, wherein the second set of symbols is associated with a run-length violation on at least one wire of the three-wire interface; and a demapper configured to convert the second set of symbols to output data, wherein a run-length violation occurs when the at least one wire remains in a same signaling state during transmission of a predefined number of successive symbols.

25. The apparatus of claim 24, wherein a decoding scheme used by apparatus defines a set of valid sequences of symbols, wherein the demapper is configured to use a subset of the set of valid sequences of symbols, and wherein the first set of symbols is not included in the set of valid sequences of symbols.

26. The apparatus of claim 24, wherein the run-length violation occurs when one or more wires of the three-wire interface fail to change state while a predefined number of symbols are sequentially transmitted on the three-wire interface.

27. The apparatus of claim 24, wherein the run-length violation is likely to occur if the second set of symbols includes a portion of a combination of symbols known to cause the run-length violation at a beginning of the first set of symbols.

28. The apparatus of claim 24, wherein the run-length violation is likely to occur if the second set of symbols includes a portion of a combination of symbols known to cause the run-length violation at an end of the first set of symbols.

29. The apparatus of claim 24, wherein each of the first set of symbols and the second set of symbols includes seven symbols.

30. The apparatus of claim 29, wherein the demapper is configured to demap 16 bits of data from the second set of symbols.

* * * * *